US012741524B2

(12) United States Patent
Thombre et al.

(10) Patent No.: US 12,741,524 B2
(45) Date of Patent: Sep. 22, 2026

(54) BATTERY ATTACHMENT FOR VEHICLES

(71) Applicant: Rivian IP Holdings, LLC, Irvine, CA (US)

(72) Inventors: Akash Thombre, Tustin, CA (US); Piyush Khater, Mission Viejo, CA (US); Adam Richard Ballard, Corona, CA (US); Andrew O'Bannon, Clarkston, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 306 days.

(21) Appl. No.: 18/582,498

(22) Filed: Feb. 20, 2024

(65) Prior Publication Data

US 2025/0262923 A1 Aug. 21, 2025

(51) Int. Cl.

*B60K 1/04* (2019.01)
*B62D 21/15* (2006.01)
*B62D 27/06* (2006.01)
*H01M 50/249* (2021.01)
*H01M 50/262* (2021.01)

(52) U.S. Cl.

CPC .............. *B60K 1/04* (2013.01); *B62D 21/155* (2013.01); *B62D 27/065* (2013.01); *H01M 50/249* (2021.01); *H01M 50/262* (2021.01); *B60K 2001/0438* (2013.01); *H01M 2220/20* (2013.01)

(58) Field of Classification Search

CPC .... B60K 1/04; B60K 2001/0438; B60K 1/00; B62D 21/155; B62D 27/065; H01M 50/249; H01M 50/262; H01M 2220/20; H01M 50/258; B60L 50/66

See application file for complete search history.

(56) References Cited

U.S. PATENT DOCUMENTS 7,213,873 B2 * 5/2007 Murata .................. B62D 21/11 296/204
9,533,600 B1 1/2017 Schwab et al.
2024/0001992 A1 * 1/2024 Lee ...................... B62D 21/155

FOREIGN PATENT DOCUMENTS

CN 216055006 U * 3/2022
JP 6314757 B2 * 4/2018
JP 6487977 B2 * 3/2019 ........... B62D 21/152

OTHER PUBLICATIONS

CN-216055006-U English Translation (Year: 2022).*
JP-6314757-B2 English Translation (Year: 2018).*
JP-6487977-B2 English Translation (Year: 2019).*

* cited by examiner

*Primary Examiner* — Michael T. Walsh
(74) *Attorney, Agent, or Firm* — BakerHostetler

(57) ABSTRACT

Aspects of the subject disclosure relate to a battery-to-subframe attachment for a vehicle. The battery-to-subframe attachment may form a load path from a front subframe of a vehicle to one or more longitudinal members of a battery pack for the vehicle. This attachment may help to utilize the mass and strength of a battery pack as an integral part of the structure of the vehicle, and may also improve torsional and bending stiffness of the vehicle via attachment between the subframe and the battery pack.

19 Claims, 19 Drawing Sheets

216
218
215
219
210
212
208

205
306
300
504
606
602
302
x
y
z

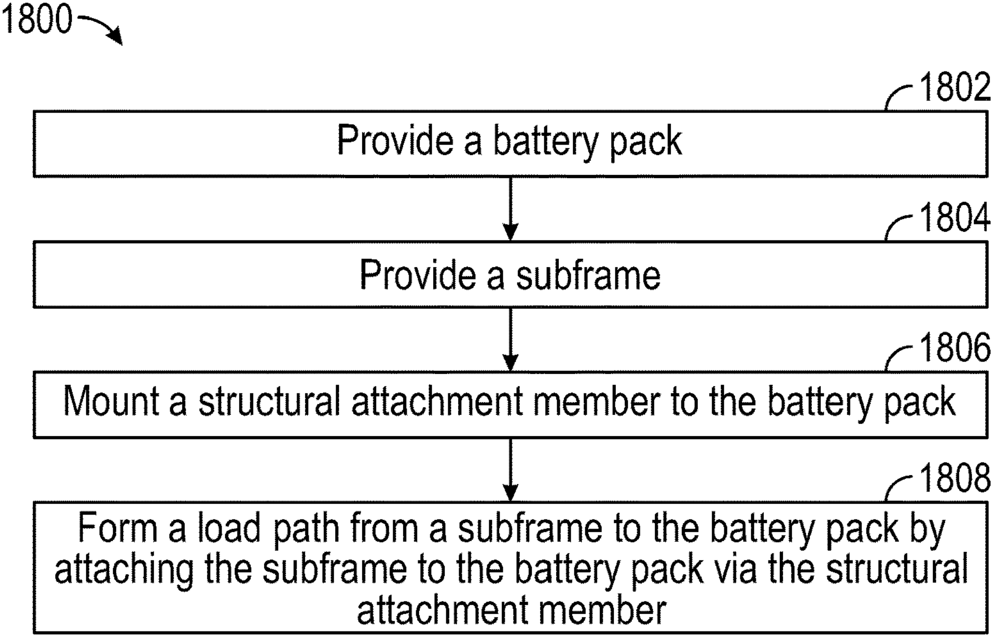

1902 Detach a subframe of a vehicle from a body of the vehicle and from a structural attachment member that is attached to a battery pack of the vehicle 1904 Remove the subframe from the vehicle without removing the battery pack from the body of the vehicle

2002 Detach a battery of a vehicle from a body of the vehicle and from a structural attachment member that is attached to a subframe of the vehicle 2004 Remove the battery from the vehicle without removing the subframe from the body of the vehicle

FIG. 20

BATTERY ATTACHMENT FOR VEHICLES

INTRODUCTION

Batteries are often used as a source of power, including as a source of power for electric vehicles that include wheels that are driven by an electric motor that receives power from the battery.

Aspects of the subject technology can help to improve the reliability and/or range of electric vehicles, which can help to mitigate climate change by reducing greenhouse gas emissions.

SUMMARY

Aspects of the subject technology relate to a battery-to-subframe attachment for a vehicle. The battery-to-subframe attachment may form a load path from a front subframe to one or more longitudinal members of a battery pack for the vehicle. This attachment may help facilitate a reduction or omission of a vehicle frame, which can reduce the weight of the vehicle while maintaining structural integrity, thereby extending the range and reliability of the vehicle. This attachment may also improve torsional and bending stiffness of the vehicle via attachment between the subframe and the battery pack.

In accordance with aspects of the subject technology, an apparatus is provided that includes a structural attachment member configured to: attach a battery pack for a vehicle to a subframe of the vehicle, and provide a load path from the subframe to the battery pack. The subframe may include a front subframe of the vehicle, and the structural attachment member may be configured to attach to a first end of the front subframe, opposite a second end of the front subframe, the second end of the front subframe configured to couple to a front bumper of the vehicle. The load path may be formed, at least in part, by an alignment of a longitudinal portion of the subframe, the structural attachment member, and a longitudinal member of the battery pack.

The structural attachment member may include: a first set of attachment features for attaching the structural attachment member to a frame of the battery pack; and a second set of attachment features for attaching the structural attachment member to the subframe of the vehicle. The second set of attachment features may be configured for attaching the structural attachment member to the subframe and to a body of the vehicle. The second set of attachment features may include one or more sliding bushings configured to facilitate assembly of the structural attachment member to the subframe and torquing of one or more bolts for securing the structural attachment member to the subframe.

The one or more sliding bushings may include a plurality of sliding bushings configured to provide a bending strength for an assembly including the subframe, the structural attachment member, and the battery pack. The one or more sliding bushings may include a single sliding bushing, and the second set of attachment features may include an end plate having an opening that is aligned with the single sliding bushing. The first set of attachment features may include one or more openings configured to receive one or more bolts that pass through a plate attached to the frame of the battery pack. The first set of attachment features may include one or more openings configured to receive one or more bolts that extend from a bracket that is welded to the frame of the battery pack.

In accordance with other aspects of the subject technology, an apparatus is provided that includes a subframe for a vehicle, and a battery pack having a longitudinal member. A load path may extend along a continuous line from the subframe to the longitudinal member of the battery pack. The apparatus may also include a structural attachment member coupled between the subframe and the battery pack. The continuous line may be a smoothly continuous line, and the structural attachment member may form a portion of the load path and align a longitudinal member of the subframe and the longitudinal member of the battery pack along the smoothly continuous line.

The subframe may be attachable, at a first end, to the structural attachment member, and, at a second end, to a bumper of the vehicle. The structural attachment member may be attached to a first end of a frame the battery pack, and the battery pack may include, attached to the frame at or near a second end of the frame, a modular enclosure for one or more electrical components. The subframe may include a frame structure that defines a first portion of the load path, the first portion coupled, via the structural attachment member, to a second portion of the load path, the second portion defined by the longitudinal member of the battery pack. The load path may include a first load path, and a second load path may extend, in parallel with the first load path, along another smoothly continuous line from the subframe to another longitudinal member of the battery pack.

In accordance with other aspects of the subject technology, a vehicle may be provided that includes a structural attachment member configured to: attach a battery pack for the vehicle to a subframe of the vehicle, and provide a load path from the subframe to the battery pack. The vehicle may also include the battery pack, and a bracket welded to a frame of the battery pack and having one or more features configured to secure the structural attachment member to a frame of the battery pack. The vehicle may also include a vehicle body. The subframe may be configured to be mounted to the vehicle body via the structural attachment member. The subframe may be detachable from the structural attachment member and the battery pack without removing the battery pack from the vehicle. The battery pack may be removable from the vehicle without removing the subframe from the vehicle.

BRIEF DESCRIPTION OF THE DRAWINGS

Certain features of the subject technology are set forth in the appended claims. However, for purpose of explanation, several embodiments of the subject technology are set forth in the following figures.

FIG. 18 illustrates a flow chart of illustrative operations that may be performed for assembling a vehicle in accordance with one or more implementations.

FIG. 19 illustrates a flow chart of illustrative operations that may be performed for servicing a vehicle in accordance with one or more implementations.

FIG. 20 illustrates a flow chart of other illustrative operations that may be performed for servicing a vehicle in accordance with one or more implementations.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Aspects of the subject technology described herein relate to a battery-to-subframe attachment for a vehicle. Vehicles are typically provided with a vehicle frame that substantially spans the length and width of the vehicle and provides a rigid structure to which other vehicle components, including the vehicle body, are mounted. The vehicle frame is typically formed from a metal, such as steel, and is designed to absorb and direct forces from external loads, such as the load of an impact to the vehicle by another vehicle or object.

Electric vehicles, such as fully electric or partially electric (e.g., hybrid) vehicles also often include a battery pack. In some scenarios, the battery pack can be comparable in size and weight to the vehicle frame, and is typically mounted to the vehicle frame. The vehicle frame is often designed to route external loads away from the battery pack, to avoid damage to the batteries within the battery pack. However, this can be an inefficient use of the size, strength, and weight of the battery pack itself.

In accordance with one or more implementations of the subject technology, a battery pack may be used as a structural component of a vehicle, and can even replace, or otherwise facilitate removal or reduction of, some or all of the vehicle frame. In one or more implementations, a structural attachment member may be provided that couples a battery pack to a subframe for a vehicle in a way that forms a load path from the subframe to one or more structural components of a frame of a battery pack. In this way, the size, weight, and strength of the battery pack itself can be put to use to strengthen the vehicle structure, while reducing or eliminating the need for a separate vehicle frame. This can reduce the weight of an electric vehicle, extending the range thereof, which can help to mitigate climate change by reducing greenhouse gas emissions.

Figure 1A:
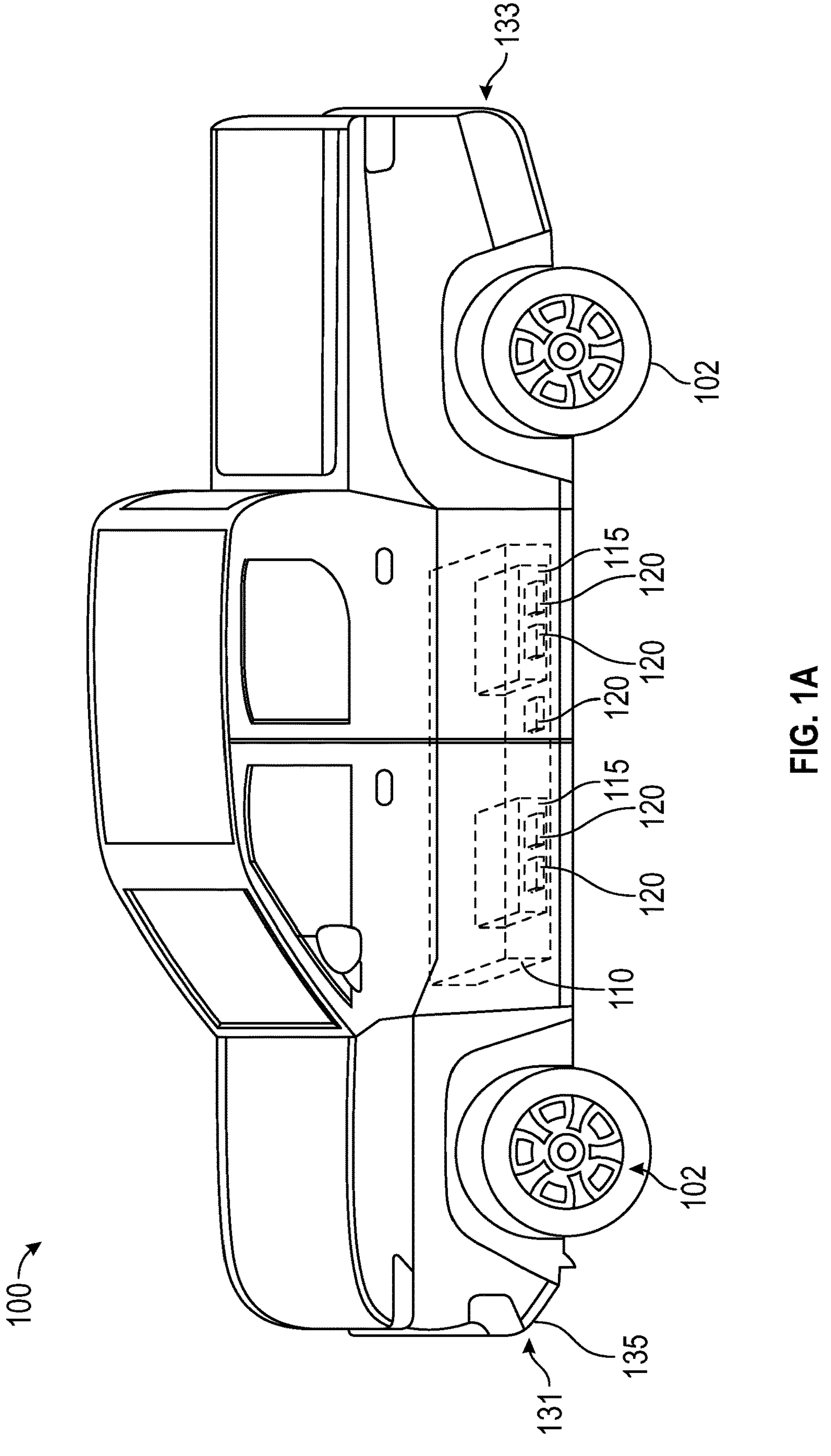
FIGS. 1A and 1B illustrate schematic perspective side views of example implementations of a vehicle having a battery pack in accordance with one or more implementations.

FIG. 1A is a diagram illustrating an example implementation of a moveable apparatus as described herein. In the example of FIG. 1A, a moveable apparatus is implemented as a vehicle 100. As shown, the vehicle 100 may include one or more battery packs, such as battery pack 110. The battery pack 110 may be coupled to one or more electrical systems of the vehicle 100 to provide power to the electrical systems.

In one or more implementations, the vehicle 100 may be an electric vehicle having one or more electric motors that drive the wheels 102 of the vehicle using electric power from the battery pack 110. In one or more implementations, the vehicle 100 may also, or alternatively, include one or more chemically powered engines, such as a gas-powered engine or a fuel cell powered motor. For example, electric vehicles can be fully electric or partially electric (e.g., hybrid or plug-in hybrid.

In the example of FIG. 1A, the vehicle 100 is implemented as a truck (e.g., a pickup truck) having a battery pack

110. As shown, the battery pack 110 may include one or more battery modules 115, which may include one or more battery cells 120. As shown in FIG. 1A, the battery pack 110 may also, or alternatively, include one or more battery cells 120 mounted directly in the battery pack 110 (e.g., in a cell-to-pack configuration). In one or more implementations, the battery pack 110 may be provided without any battery modules 115 and with the battery cells 120 mounted directly in the battery pack 110 (e.g., in a cell-to-pack configuration) and/or in other battery units that are installed in the battery pack 110. A vehicle battery pack can include multiple energy storage devices that can be arranged into such as battery modules or battery units. A battery unit or module can include an assembly of cells that can be combined with other elements (e.g., structural frame, thermal management devices) that can protect the assembly of cells from heat, shock and/or vibrations.

For example, the battery cell 120 can be included a battery, a battery unit, a battery module and/or a battery pack to power components of the vehicle 100. For example, a battery cell housing of the battery cell 120 can be disposed in the battery module 115, the battery pack 110, a battery array, or other battery unit installed in the vehicle 100.

As discussed in further detail hereinafter, the battery cells 120 may be provided with a battery cell housing that can be provided with any of various outer shapes. The battery cell housing may be a rigid housing in some implementations (e.g., for cylindrical or prismatic battery cells). The battery cell housing may also, or alternatively, be formed as a pouch or other flexible or malleable housing for the battery cell in some implementations. In various other implementations, the battery cell housing can be provided with any other suitable outer shape, such as a triangular outer shape, a square outer shape, a rectangular outer shape, a pentagonal outer shape, a hexagonal outer shape, or any other suitable outer shape. In some implementations, the battery pack 110 may not include modules (e.g., the battery pack may be module-free). For example, the battery pack 110 can have a module-free or cell-to-pack configuration in which the battery cells 120 are arranged directly into the battery pack 110 without assembly into a battery module 115. In one or more implementations, the vehicle 100 may include one or more busbars, electrical connectors, or other charge collecting, current collecting, and/or coupling components to provide electrical power from the battery pack 110 to various systems or components of the vehicle 100. In one or more implementations, the vehicle 100 may include control circuitry such as a power stage circuit that can be used to convert DC power from the battery pack 110 into AC power for one or more components and/or systems of the vehicle (e.g., including one or more power outlets of the vehicle and/or the motor(s) that drive the wheels 102 of the vehicle). The power stage circuit can be provided as part of the battery pack 110 or separately from the battery pack 110 within the vehicle 100.

The vehicle 100 may have a front end 131 and a rear end 133. As shown, the front end 131 of the vehicle 100 may include a bumper 135. For example, the bumper 135 may include a bumper portion of a front fascia of the vehicle and/or a bumper structure that is located behind the front fascia and configured to absorb some or all of an impact to the front end 131 of the vehicle 100.

Figure 1B:
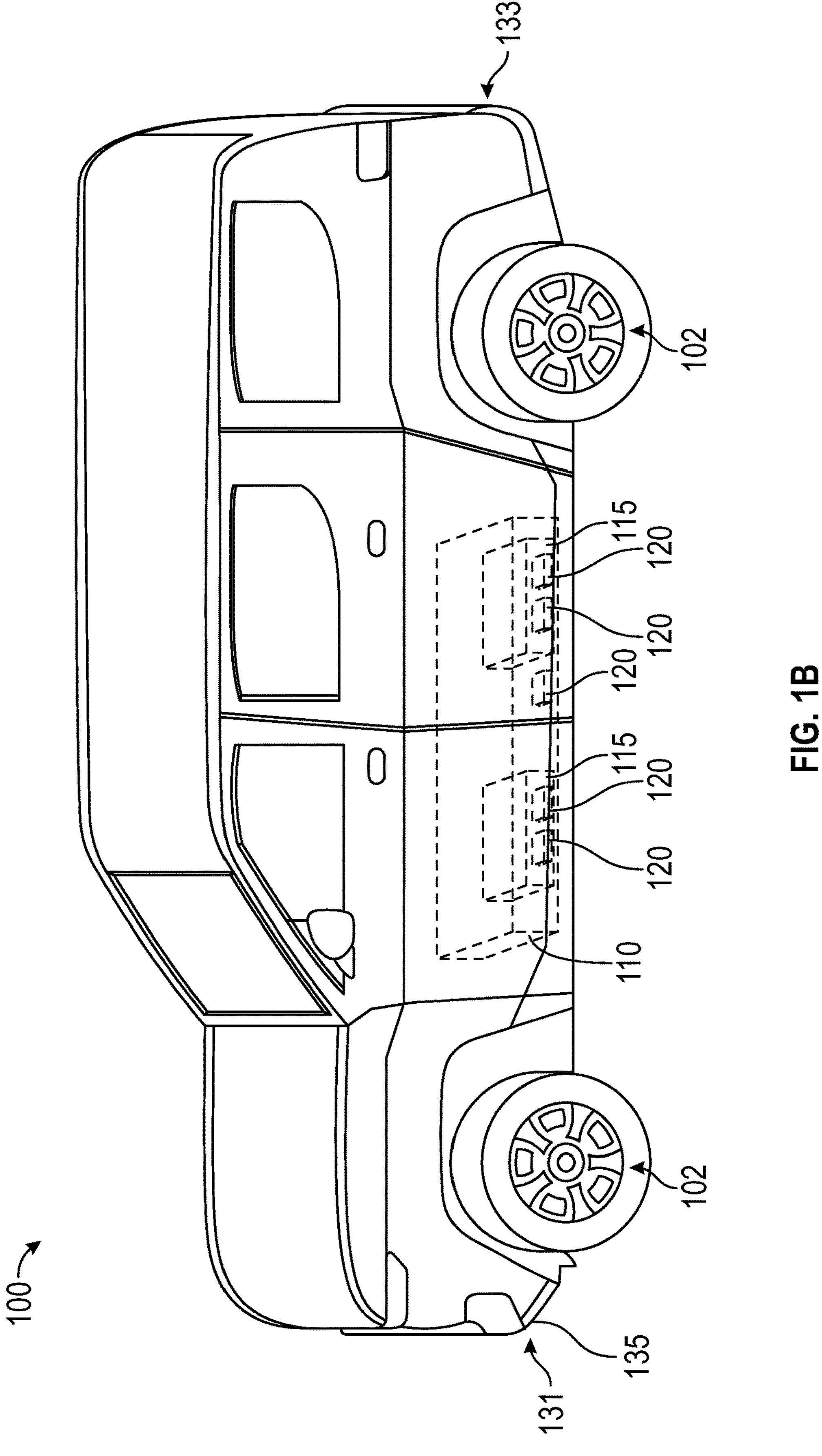

The example of FIG. 1A in which the vehicle 100 is implemented as a pickup truck having a truck bed at the rear portion thereof is merely illustrative. For example, FIG. 1B illustrates another implementation in which the vehicle 100 including the battery pack 110 is implemented as a sport utility vehicle (SUV), such as an electric sport utility vehicle. In the example of FIG. 1B, the vehicle 100 including the battery pack 110 may include a cargo storage area that is enclosed within the vehicle 100 (e.g., behind a row of seats within a cabin of the vehicle). In other implementations, the vehicle 100 may be implemented as another type of electric truck, an electric delivery van, an electric automobile, an electric car, an electric motorcycle, an electric scooter, an electric bicycle, an electric passenger vehicle, an electric passenger or commercial truck, a hybrid vehicle, an aircraft, a watercraft, and/or any other movable apparatus having a battery pack 110 (e.g., a battery pack or other battery unit that powers the propulsion or drive components of the moveable apparatus).

Figure 1C:
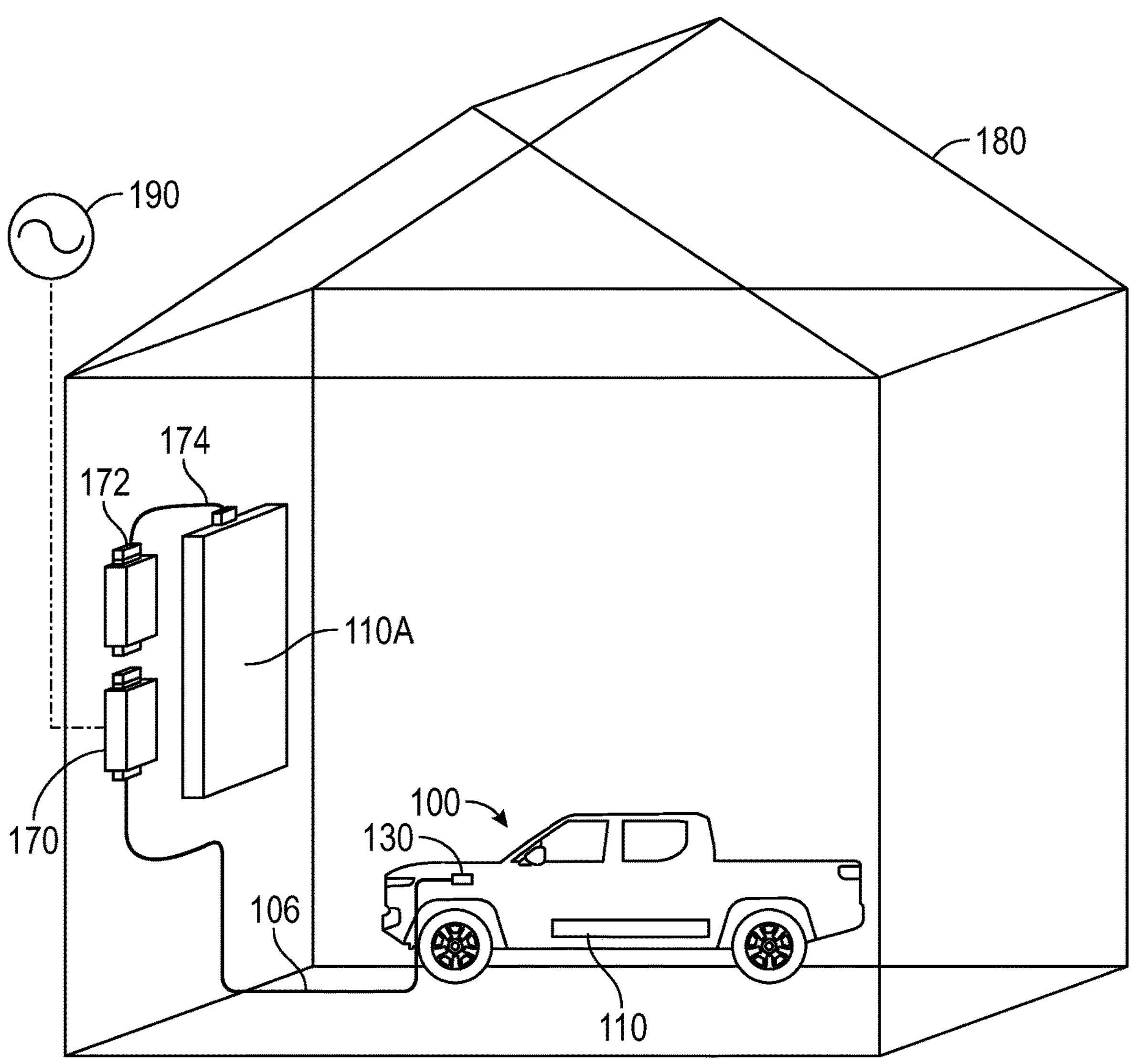
FIG. 1C illustrates a schematic perspective view of a building having a battery pack in accordance with one or more implementations.

In one or more implementations, a battery pack such as the battery pack 110, a battery module 115, a battery cell 120, and/or any other battery unit as described herein may also, or alternatively, be implemented as an electrical power supply and/or energy storage system in a building, such as a residential home or commercial building. For example, FIG. 1C illustrates an example in which a battery pack 110 is implemented in a building 180. For example, the building 180 may be a residential building, a commercial building, or any other building. As shown, in one or more implementations, a battery pack 110 may be mounted to a wall of the building 180.

As shown, the battery 110A that is installed in the building 180 may be couplable to the battery pack 110 in the vehicle 100, such as via: a cable/connector 106 that can be connected to the charging port 130 of the vehicle 100, electric vehicle supply equipment 170 (EVSE), a power stage circuit 172, and/or a cable/connector 174. For example, the cable/connector 106 may be coupled to the EVSE 170, which may be coupled to the battery 110A via the power stage circuit 172, and/or may be coupled to an external power source 190. In this way, either the external power source 190 or the battery 110A that is installed in the building 180 may be used as an external power source to charge the battery pack 110 in the vehicle 100 in some use cases. In some examples, the battery 110A that is installed in the building 180 may also, or alternatively, be coupled (e.g., via a cable/connector 174, the power stage circuit 172, and the EVSE 170) to the external power source 190. For example, the external power source 190 may be a solar power source, a wind power source, and/or an electrical grid of a city, town, or other geographic region (e.g., electrical grid that is powered by a remote power plant). During, for example, times when the battery pack 110 in the vehicle 100 is not coupled to the battery 110A that is installed in the building 180, the battery 110A that is installed in the building 180 can be coupled (e.g., using the power stage circuit 172 for the building 180) to the external power source 190 to charge up and store electrical energy. In some use cases, this stored electrical energy in the battery 110A that is installed in the building 180 can later be used to charge the battery pack 110 in the vehicle 100 (e.g., during times when solar power or wind power is not available, in the case of a regional or local power outage for the building 180, and/or during a period of high rates for access to the electrical grid).

In one or more implementations, the power stage circuit 172 may electrically couple the battery 110A that is installed in the building 180 to an electrical system of the building 180. For example, the power stage circuit 172 may convert DC power from the battery 110A into AC power for one or more loads in the building 180. For example, the battery 110A that is installed in the building 180 may be used to power one or more lights, lamps, appliances, fans, heaters, air conditioners, and/or any other electrical components or electrical loads in the building 180 (e.g., via one or more electrical outlets that are coupled to the battery 110A that is installed in the building 180). For example, the power stage circuit 172 may include control circuitry that is operable to switchably couple the battery 110A between the external power source 190 and one or more electrical outlets and/or other electrical loads in the electrical system of the building 180. In one or more implementations, the vehicle 100 may include a power stage circuit (not shown in FIG. 1C) that can be used to convert power received from the electric vehicle supply equipment 170 to DC power that is used to power/charge the battery pack 110 of the vehicle 100, and/or to convert DC power from the battery pack 110 into AC power for one or more electrical systems, components, and/or loads of the vehicle 100.

In one or more use cases, the battery 110A that is installed in the building 180 may be used as a source of electrical power for the building 180, such as during times when solar power or wind power is not available, in the case of a regional or local power outage for the building 180, and/or during a period of high rates for access to the electrical grid (as examples). In one or more other use cases, the battery pack 110 that is installed in the vehicle may be used to charge the battery 110A that is installed in the building 180 and/or to power the electrical system of the building 180 (e.g., in a use case in which the battery 110A that is installed in the building 180 is low on or out of stored energy and in which solar power or wind power is not available, a regional or local power outage occurs for the building 180, and/or a period of high rates for access to the electrical grid occurs (as examples)).

Figure 2A:
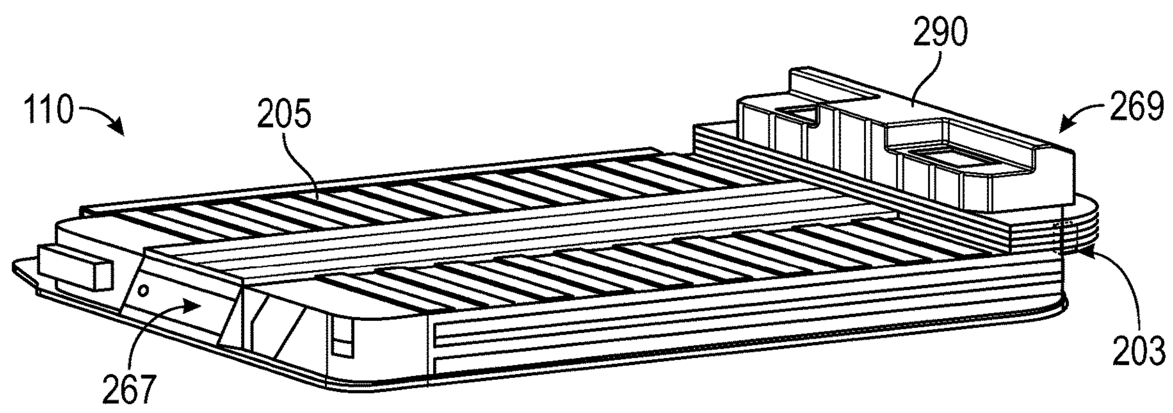
FIG. 2A illustrates a schematic perspective view of a battery pack in accordance with one or more implementations.

FIG. 2A depicts an example battery pack 110, in accordance with one or more implementations. As shown, the battery pack 110 may include a battery pack frame 205 (e.g., a battery pack housing or pack frame). For example, the battery pack frame 205 may house or enclose one or more battery modules 115 and/or one or more battery cells 120, and/or other battery pack components. In one or more implementations, the battery pack frame 205 may include or form a shielding structure on an outer surface thereof (e.g., a bottom thereof and/or underneath one or more battery module 115, battery units, batteries, and/or battery cells 120) to protect the battery module 115, battery units, batteries, and/or battery cells 120 from external conditions (e.g., if the battery pack 110 is installed in a vehicle 100 and the vehicle 100 is driven over rough terrain, such as off-road terrain, trenches, rocks, rivers, streams, etc.).

Battery pack 110 may include, within the battery pack frame 205, multiple battery cells 120 (e.g., directly installed within the battery pack 110, or within batteries, battery units, and/or battery modules 115 as described herein) and/or battery modules 115, and one or more conductive coupling elements for coupling a voltage generated by the battery cells 120 to a power-consuming component, such as the vehicle 100 and/or an electrical system of a building 180. For example, the conductive coupling elements may include internal connectors and/or contactors that couple together multiple battery cells 120, battery units, batteries, and/or multiple battery modules 115 within the battery pack frame 205 to generate a desired output voltage for the battery pack 110.

As shown, the battery pack 110 may also include a modular enclosure 290 mounted to the battery pack frame 205. In one or more implementations, the modular enclosure 290 may include one or more of the conductive coupling elements for routing power from the battery cells 120 and/or battery modules 115 within the pack frame 205 to one or more external connection ports, such as electrical contact 203 (e.g., a high voltage terminal). For example, an electrical cable (e.g., cable/connector 106) may be connected between the electrical contact 203 and an electrical system of the vehicle 100 or the building 180, to provide electrical power to the vehicle 100 or the building 180. The battery pack frame 205 may have a front end 267 and a rear end 269. As shown, the modular enclosure 290 may be mounted to the pack frame 205 at the rear end 269 in one or more implementations.

In one or more implementations, the battery pack 110 may include one or more additional features, such as thermal control structures (e.g., cooling lines and/or plates and/or heating lines and/or plates). For example, thermal control structures may couple thermal control structures and/or fluids to the battery modules 115, battery units, batteries, and/or battery cells 120 within the battery pack frame 205, such as by distributing fluid through the battery pack 110.

For example, the thermal control structures may form a part of a thermal/temperature control or heat exchange system that includes one or more thermal components such as plates or bladders that are disposed in thermal contact with one or more battery modules 115 and/or battery cells 120 disposed within the battery pack frame 205. For example, a thermal component may be positioned in contact with one or more battery modules 115, battery units, batteries, and/or battery cells 120 within the battery pack frame 205. In one or more implementations, the battery pack 110 may include one or multiple thermal control structures and/or other thermal components for each of several top and bottom battery module pairs. As shown, the battery pack 110 may include an electrical contact 203 (e.g., a high voltage connector) by which an external load (e.g., the vehicle 100 or an electrical system of the building 180) may be electrically coupled to the battery modules and/or battery cells in the battery pack 110.

Figure 2B:
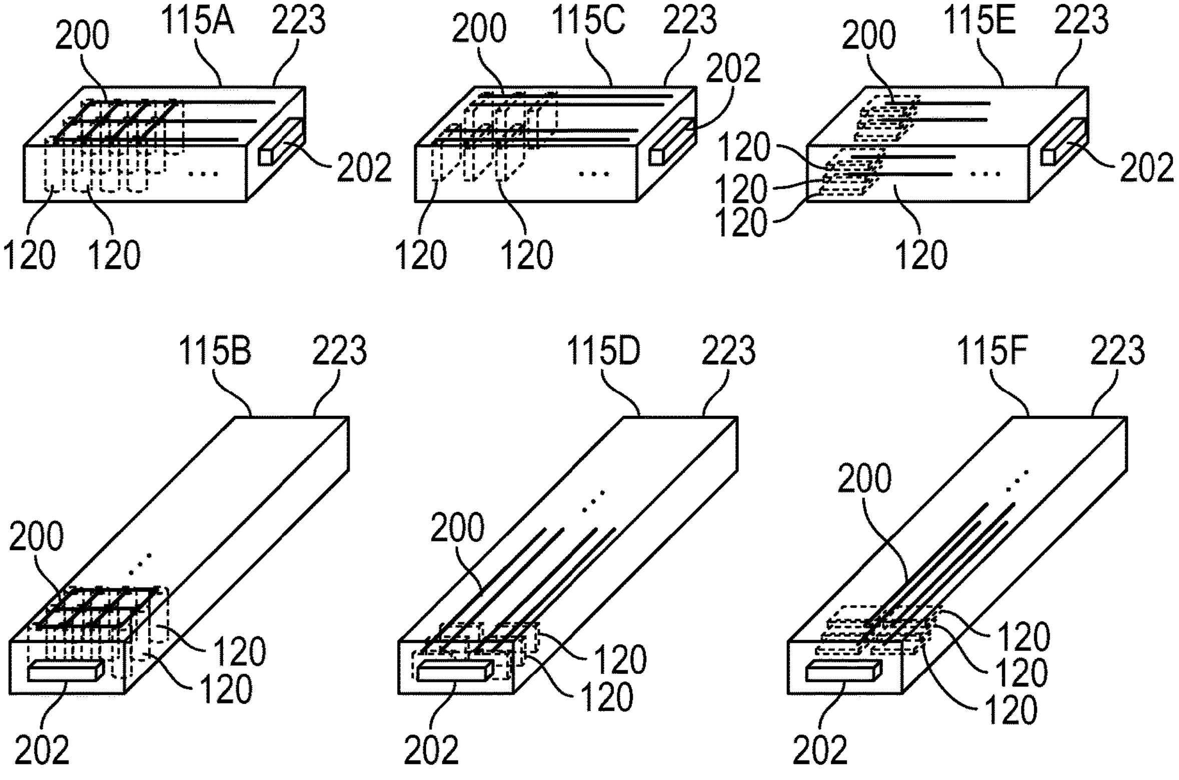
FIG. 2B illustrates schematic perspective views of various battery modules that may be included in a battery pack in accordance with one or more implementations.

FIG. 2B depicts various examples of battery modules 115 that may be disposed in the battery pack 110 (e.g., within the battery pack frame 205 of FIG. 2A). In the example of FIG. 2B, a battery module 115A is shown that includes a battery module housing 223 having a rectangular cuboid shape with a length that is substantially similar to its width. In this example, the battery module 115A includes multiple battery cells 120 implemented as cylindrical battery cells. In this example, the battery module 115A includes rows and columns of cylindrical battery cells that are coupled together by an interconnect structure 200 (e.g., a current connector assembly or CCA). For example, the interconnect structure 200 may couple together the positive terminals of the battery cells 120, and/or couple together the negative battery terminals of the battery cells 120. As shown, the battery module 115A may include a charge collector or bus bar 202. For example, the bus bar 202 may be electrically coupled to the interconnect structure 200 to collect the charge generated by the battery cells 120 to provide a high voltage output from the battery module 115A.

FIG. 2B also shows a battery module 115B having an elongate shape, in which the length of the battery module housing 223 (e.g., extending along a direction from a front end of the battery pack 110 to a rear end of the battery pack 110 when the battery module 115B is installed in the battery pack 110) is substantially greater than a width (e.g., in a transverse direction to the direction from the front end of the battery pack 110 to the rear end of the battery pack 110 when the battery module 115B is installed in the battery pack 110) of the battery module housing 223. For example, one or more battery modules 115B may span the entire front-to-back length of a battery pack within the battery pack frame 205. As shown, the battery module 115B may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115B.

In the implementations of battery module 115A and battery module 115B, the battery cells 120 are implemented as cylindrical battery cells. However, in other implementations, a battery module may include battery cells having other form factors, such as a battery cells having a right prismatic outer shape (e.g., a prismatic cell), or a pouch cell implementation of a battery cell. As an example, FIG. 2B also shows a battery module 115C having a battery module housing 223 having a rectangular cuboid shape with a length that is substantially similar to its width and including multiple battery cells 120 implemented as prismatic battery cells. In this example, the battery module 115C includes rows and columns of prismatic battery cells that are coupled together by an interconnect structure 200 (e.g., a current collector assembly or CCA). For example, the interconnect structure 200 may couple together the positive terminals of the battery cells 120 and/or couple together the negative battery terminals of the battery cells 120. As shown, the battery module 115C may include a charge collector or bus bar 202. For example, the bus bar 202 may be electrically coupled to the interconnect structure 200 to collect the charge generated by the battery cells 120 to provide a high voltage output from the battery module 115C.

FIG. 2B also shows a battery module 115D including prismatic battery cells and having an elongate shape, in which the length of the battery module housing 223 (e.g., extending along a direction from a front end of the battery pack 110 to a rear end of the battery pack 110 when the battery module 115D is installed in the battery pack 110) is substantially greater than a width (e.g., in a transverse direction to the direction from the front end of the battery pack 110 to the rear end of the battery pack 110 when the battery module 115D is installed in the battery pack 110) of the battery module housing 223. For example, one or more battery modules 115D having prismatic battery cells may span the entire front-to-back length of a battery pack within the battery pack frame 205. As shown, the battery module 115D may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115D.

As another example, FIG. 2B also shows a battery module 115E having a battery module housing 223 having a rectangular cuboid shape with a length that is substantially similar to its width and including multiple battery cells 120 implemented as pouch battery cells. In this example, the battery module 115C includes rows and columns of pouch battery cells that are coupled together by an interconnect structure 200 (e.g., a current collector assembly or CCA). For example, the interconnect structure 200 may couple together the positive terminals of the battery cells 120 and couple together the negative battery terminals of the battery cells 120. As shown, the battery module 115E may include a charge collector or bus bar 202. For example, the bus bar 202 may be electrically coupled to the interconnect structure 200 to collect the charge generated by the battery cells 120 to provide a high voltage output from the battery module 115E.

FIG. 2B also shows a battery module 115F including pouch battery cells and having an elongate shape in which the length of the battery module housing 223 (e.g., extending along a direction from a front end of the battery pack 110 to a rear end of the battery pack 110 when the battery module 115E is installed in the battery pack 110) is substantially greater than a width (e.g., in a transverse direction to the direction from the front end of the battery pack 110 to the rear end of the battery pack 110 when the battery module 115E is installed in the battery pack 110) of the battery module housing 223. For example, one or more battery modules 115E having pouch battery cells may span the entire front-to-back length of a battery pack within the battery pack frame 205. As shown, the battery module 115E may also include a bus bar 202 electrically coupled to the interconnect structure 200. For example, the bus bar 202 may be electrically coupled to the interconnect structure 200 to collect the charge generated by the battery cells 120 to provide a high voltage output from the battery module 115E.

In various implementations, a battery pack 110 may be provided with one or more of any of the battery modules 115A, 115B, 115C, 115D, 115E, and 115F. In one or more other implementations, a battery pack 110 may be provided without battery modules 115 (e.g., in a cell-to-pack implementation). In one or more implementations, the battery pack 110 may include three of the battery modules 115A (e.g., with the elongate dimension of each of the battery modules 115A extending along a direction from the front 267 to the rear 269 of the battery pack 110) that are separated from each other by longitudinal members that extend, between pairs of the three battery modules 115A from the front 267 to the rear 269 of the battery pack 110.

In one or more implementations, multiple battery modules 115 in any of the implementations of FIG. 2B may be coupled (e.g., in series) to a current collector of the battery pack 110. In one or more implementations, the current collector may be coupled, via a high voltage harness, to one or more external connectors (e.g., electrical contact 203) on the battery pack 110. In one or more implementations, the battery pack 110 may be provided without any battery modules 115. For example, the battery pack 110 may have a cell-to-pack configuration in which battery cells 120 are arranged directly into the battery pack 110 without assembly into a battery module 115 (e.g., without including a separate battery module housing 223). For example, the battery pack 110 (e.g., the battery pack frame 205) may include or define a plurality of structures for positioning of the battery cells 120 directly within the battery pack frame 205.

Figure 2C:
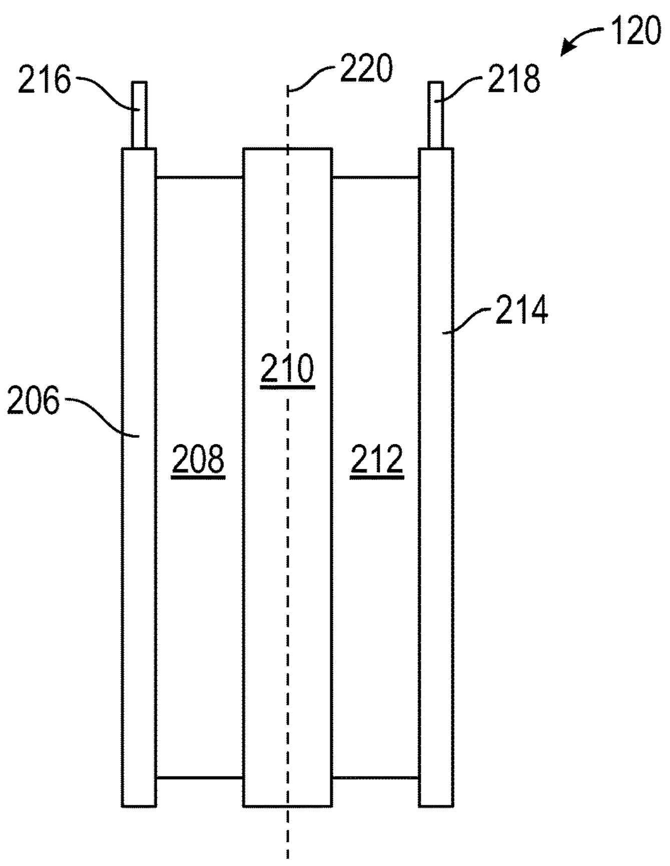
FIG. 2C illustrates a cross-sectional end view of a battery cell in accordance with one or more implementations.

FIG. 2C illustrates a cross-sectional end view of a portion of a battery cell 120. As shown in FIG. 2C, a battery cell 120 may include an anode 208, an electrolyte 210, and a cathode 212. As shown, the anode 208 may include or be electrically coupled to a first current collector 206 (e.g., a metal layer such as a layer of copper foil or other metal foil). As shown, the cathode 212 may include or be electrically coupled to a second current collector 214 (e.g., a metal layer such as a layer of aluminum foil or other metal foil). As shown, the battery cell 120 may include a first terminal 216 (e.g., a negative terminal) coupled to the anode 208 (e.g., via the first current collector 206) and a second terminal 218 (e.g., a positive terminal) coupled to the cathode (e.g., via the second current collector 214). In various implementations, the electrolyte 210 may be a liquid electrolyte layer or a solid electrolyte layer. In one or more implementations (e.g., implementations in which the electrolyte 210 is a liquid electrolyte layer), the battery cell 120 may include a separator layer 220 that separates the anode 208 from the cathode 212. In one or more implementations in which the electrolyte 210 is a solid electrolyte layer, the solid electrolyte layer may act as both separator layer and an electrolyte layer.

In one or more implementations, the battery cell 120 may be implemented as a lithium ion battery cell in which the anode 208 is formed from a carbonaceous material (e.g., graphite or silicon-carbon). In these implementations, lithium ions can move from the anode 208, through the electrolyte 210, to the cathode 212 during discharge of the battery cell 120 (e.g., and through the electrolyte 210 from the cathode 212 to the anode 208 during charging of the battery cell 120). For example, the anode 208 may be formed from a graphite material that is coated on a copper foil corresponding to the first current collector 206. In these lithium ion implementations, the cathode 212 may be formed from one or more metal oxides (e.g., a lithium cobalt oxide, a lithium manganese oxide, a lithium nickel manganese cobalt oxide (NMC), or the like) and/or a lithium iron phosphate. As shown, the battery cell 120 may include a separator layer 220 that separates the anode 208 from the cathode 212. In an implementation in which the battery cell 120 is implemented as a lithium-ion battery cell, the electrolyte 210 may include a lithium salt in an organic solvent. The separator layer 220 may be formed from one or more insulating materials (e.g., a polymer such as polyethylene, polypropylene, polyolefin, and/or polyamide, or other insulating materials such as rubber, glass, cellulose or the like). The separator layer 220 may prevent contact between the anode 208 and the cathode 212, and may be permeable to the electrolyte 210 and/or ions within the electrolyte 210. In one or more implementations, the battery cell 120 may be implemented as a lithium polymer battery cell having a dry solid polymer electrolyte and/or a gel polymer electrolyte.

Although some examples are described herein in which the battery cells 120 are implemented as lithium-ion battery cells, some or all of the battery cells 120 in a battery module 115, battery pack 110, or other battery or battery unit may be implemented using other battery cell technologies, such as nickel-metal hydride battery cells, sodium ion battery cells, lead-acid battery cells, and/or ultracapacitor cells. For example, in a nickel-metal hydride battery cell, the anode 208 may be formed from a hydrogen-absorbing alloy and the cathode 212 may be formed from a nickel oxide-hydroxide. In the example of a nickel-metal hydride battery cell, the electrolyte 210 may be formed from an aqueous potassium hydroxide in one or more examples.

The battery cell 120 may be implemented as a lithium sulfur battery cell in one or more other implementations. For example, in a lithium sulfur battery cell, the anode 208 may be formed at least in part from lithium, the cathode 212 may be formed from at least in part form sulfur, and the electrolyte 210 may be formed from a cyclic ether, a short-chain ether, a glycol ether, an ionic liquid, a super-saturated salt-solvent mixture, a polymer-gelled organic media, a solid polymer, a solid inorganic glass, and/or other suitable electrolyte materials.

Figure 2D:
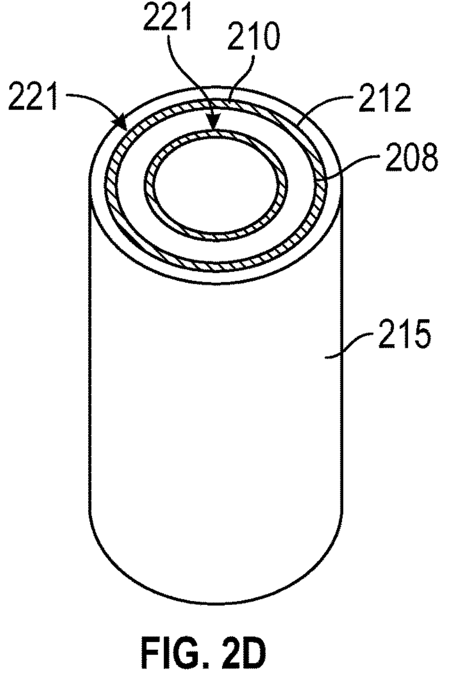
FIG. 2D illustrates a cross-sectional perspective view of a cylindrical battery cell in accordance with one or more implementations.

In various implementations, the anode 208, the electrolyte 210, and the cathode 212 of FIG. 2C can be packaged into a battery cell housing having any of various shapes, and/or sizes, and/or formed from any of various suitable materials. For example, battery cells 120 can have a cylindrical, rectangular, square, cubic, flat, pouch, elongated, or prismatic outer shape. As depicted in FIG. 2D, for example, a battery cell such as the battery cell 120 may be implemented as a cylindrical cell. In the example of FIG. 2D, the battery cell 120 includes a cell housing 215 having a cylindrical outer shape. For example, the anode 208, the electrolyte 210, and the cathode 212 may be rolled into one or more substantially cylindrical windings 221. As shown, one or more windings 221 of the anode 208, the electrolyte 210, and the cathode 212 (e.g., and/or one or more separator layers such as separator layer 220) may be disposed within the cell housing 215. For example, a separator layer may be disposed between adjacent ones of the windings 221. However, the cylindrical cell implementation of FIG. 2D is merely illustrative, and other implementations of the battery cells 120 are contemplated.

Figures 2E, 2F:
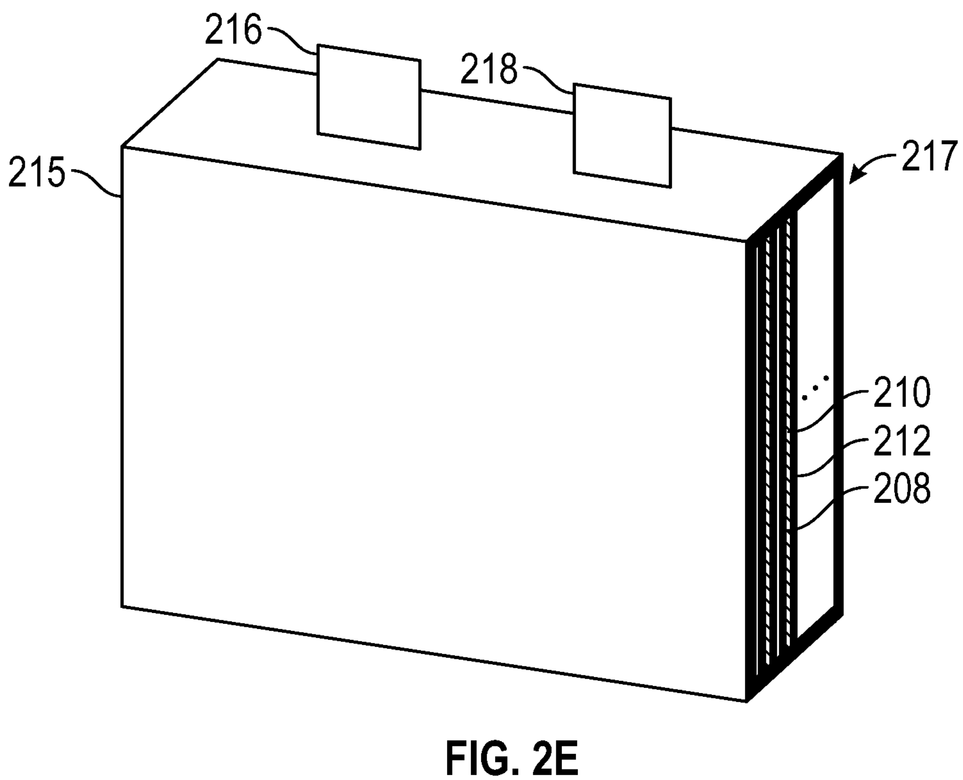
FIG. 2E illustrates a cross-sectional perspective view of a prismatic battery cell in accordance with one or more implementations.
FIG. 2F illustrates a cross-sectional perspective view of a pouch battery cell in accordance with one or more implementations.

For example, FIG. 2E illustrates an example in which the battery cell 120 is implemented as a prismatic cell. As shown in FIG. 2E, the battery cell 120 may have a cell housing 215 having a right prismatic outer shape. As shown, one or more layers of the anode 208, the cathode 212, and the electrolyte 210 disposed therebetween may be disposed (e.g., with separator materials between the layers) within the cell housing 215 having the right prismatic shape. As examples, multiple layer of the anode 208, electrolyte 210, and cathode 212 can be stacked (e.g., with separator materials between each layer), or a single layer of the anode 208, electrolyte 210, and cathode 212 can be formed into a flattened spiral shape and provided in the cell housing 215 having the right prismatic shape. In the implementation of FIG. 2E, the cell housing 215 has a relatively thick cross-sectional width 217 and is formed from a rigid material. For example, the cell housing 215 in the implementation of FIG. 2E may be formed from a welded, stamped, deep drawn, and/or impact extruded metal sheet, such as a welded, stamped, deep drawn, and/or impact extruded aluminum sheet. For example, the cross-sectional width 217 of the cell housing 215 of FIG. 2E may be as much as, or more than 1 millimeter (mm) to provide a rigid housing for the prismatic battery cell. In one or more implementations, the first terminal 216 and the second terminal 218 in the prismatic cell implementation of FIG. 2E may be formed from a feedthrough conductor that is insulated from the cell housing 215 (e.g., a glass to metal feedthrough) as the conductor passes through to cell housing 215 to expose the first terminal 216 and the second terminal 218 outside the cell housing 215 (e.g., for contact with an interconnect structure 200 of FIG. 2B). However, this implementation of FIG. 2E is also illustrative and yet other implementations of the battery cell 120 are contemplated.

For example, FIG. 2F illustrates an example in which the battery cell 120 is implemented as a pouch cell. As shown in FIG. 2F, one or more layers of the anode 208, the cathode 212, and the electrolyte 210 disposed therebetween may be disposed (e.g., with separator materials between the layers) within the cell housing 215 that forms a flexible or malleable pouch housing. In the implementation of FIG. 2F, the cell housing 215 has a relatively thin cross-sectional width 219. For example, the cell housing 215 in the implementation of FIG. 2F may be formed from a flexible or malleable material (e.g., a foil, such as a metal foil, or film, such as an aluminum-coated plastic film). For example, the cross-sectional width 219 of the cell housing 215 of FIG. 2F may be as low as, or less than 0.1 mm, 0.05 mm, 0.02 mm, or 0.01 mm to provide flexible or malleable housing for the pouch battery cell. In one or more implementations, the first terminal 216 and the second terminal 218 in the pouch cell implementation of FIG. 2F may be formed from conductive tabs (e.g., foil tabs) that are coupled (e.g., welded) to the anode 208 and the cathode 212 respectively, and sealed to the pouch that forms the cell housing 215 in these implementations. In the examples of FIGS. 2C, 2E, and 2F, the first terminal 216 and the second terminal 218 are formed on the same side (e.g., a top side) of the battery cell 120. However, this is merely illustrative and, in other implementations, the first terminal 216 and the second terminal 218 may formed on two different sides (e.g., opposing sides, such as a top side and a bottom side) of the battery cell 120. The first terminal 216 and the second terminal 218 may be formed on a same side or difference sides of the cylindrical cell of FIG. 2D in various implementations.

In one or more implementations, a battery module 115, a battery pack 110, a battery unit, or any other battery may include some battery cells 120 that are implemented as solid-state battery cells and other battery cells 120 that are implemented with liquid electrolytes for lithium-ion or other battery cells having liquid electrolytes. One or more of the battery cells 120 may be included a battery module 115 or a battery pack 110, such as to provide an electrical power supply for components of the vehicle 100, the building 180, or any other electrically powered component or device. The cell housing 215 of the battery cell 120 can be disposed in the battery module 115, the battery pack 110, or installed in any of the vehicle 100, the building 180, or any other electrically powered component or device.

Figure 3:
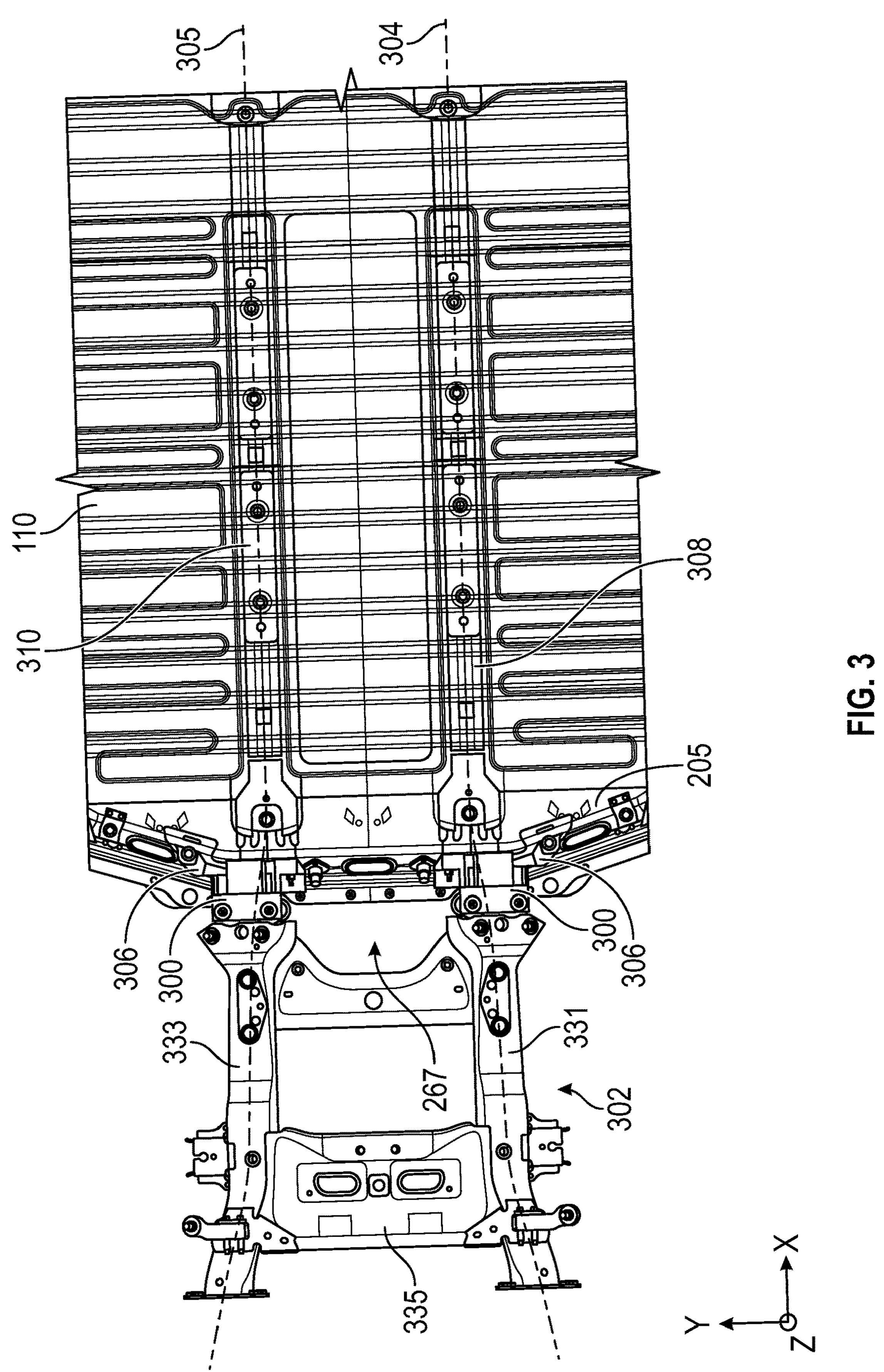
FIG. 3 illustrates a top view of an arrangement of vehicle components including a subframe, a structural attachment member, and a battery pack in accordance with one or more implementations.

As discussed herein, in one or more implementations, a battery structure, such as battery pack 110, may be used as a structural component of a vehicle, such as vehicle 100. FIG. 3 illustrates a top view of various vehicle components, in a configuration in which the battery pack 110 is implemented as a structural component for a vehicle. As shown, the battery pack 110 may include one or more longitudinal members, such as longitudinal member 308 and longitudinal member 310. In the example of FIG. 3, X, Y, and Z directions are defined, merely for convenience of the present discussion in the example of FIG. 3, the longitudinal member 308 and the longitudinal member 310 of the battery pack 110 extend along the X direction. For example, the X direction may be a direction extending from the front end 267 towards the rear end 269 of the battery pack 110, and/or from the front end 131 to the rear end 133 of the vehicle 100.

The longitudinal member 308 and the longitudinal member 310 may be formed from a rigid metal, such as steel, one or more other metals, and/or a composite thereof. The longitudinal member 308 and the longitudinal member 310 may extend within the pack frame 205 along substantially an entire length of the battery pack 110, from the front end 267 to the rear end 269 of the battery pack 110. The longitudinal member 308 and the longitudinal member 310 may extend between one or more groups of battery cells 120, such as between one or more columns of battery modules 115. Rows of battery modules 115 may include battery modules on either side of each of the longitudinal members. In this way, the longitudinal members 308 and 310 may be configured to absorb and direct a force from an impact at the front end 267 of the battery pack 110 (e.g., away from, and/or around, any battery cells 120 disposed within the battery pack 110, and/or away from and or around any passenger occupied portions of a vehicle). In the example of FIG. 3, the battery pack 110 includes two longitudinal members. However, this is merely illustrative, and a battery pack, such as battery pack 110, may include any number of longitudinal members, such as one longitudinal member, three longitudinal members, or more than three longitudinal members.

In order, for example, to integrate the battery pack 110 as a structural component of a vehicle, the vehicle may be provided with one or more structural attachment members 300. As shown in FIG. 3, a structural attachment member 300 may be attached to the pack frame 205 at the front end 267 of the battery pack 110. As shown, a structural attachment member 300 may be provided adjacent to (e.g., on an opposite side of a wall of the pack frame 205), and aligned with, each of the longitudinal members 308 and 310. In one or more implementations, a bracket 306 may be welded to, or otherwise attached to, the pack frame 205 of the battery pack 110. As discussed in further detail hereinafter, the bracket 306 may include one or more features configured to secure the structural attachment member 300 to the pack frame 205 (e.g., prior to attaching the subframe 302 to the structural attachment member 300).

As shown, each of the structural attachment members 300 may be disposed between the battery pack 110 and a subframe 302 for the vehicle. For example, the subframe 302 may be a front subframe (e.g., disposed between the front wheels 102 of an assembled vehicle 100). The subframe 302 may be formed from a rigid metal, such as steel, and may include longitudinal portions 331 and 333. In one or more implementations, the subframe 302 may also include one or more transverse portions, or crossmembers 335, that extend between the longitudinal portions of the subframe 302. As shown, the structural attachment members 300 may be configured to attach the subframe 302 to the battery pack 110, and to align the longitudinal portions 331 and 333 of the subframe 302 with the longitudinal members 308 and 310, respectively, of the battery pack 110.

As shown in FIG. 3, by aligning the longitudinal portions 331 and 333 of the subframe 302 with the longitudinal members 308 and 310, respectively, of the battery pack 110, the structural attachment members 300 may provide (e.g., may define, and form a part of) one or more load paths from the subframe 302 to the battery pack 110. For example, FIG. 3 illustrates a load path 304 that extends along a continuous line from the subframe 302 (e.g., along the longitudinal portion 331 of the subframe 302) to the longitudinal member 308 of the battery pack 110, and a load path 305 that extends along a continuous line from the subframe 302 (e.g., along the longitudinal portion 333 of the subframe 302) to the longitudinal member 310 of the battery pack 110. For example, the continuous lines of the load paths 304 and 305 may be smoothly continuous lines that are free of sharp or acute turns (e.g., free of turns at angles greater than five degrees, ten degrees, or fifteen degrees).

In various examples described herein, a structural attachment member 300 is provided that attaches to both the pack frame 205 and the subframe 302 (e.g., to form a joint between the battery pack 110 and the subframe 302). However, it is appreciated that, in other examples, load paths, such as the load paths 304 and 305, may be formed from an alignment of the longitudinal portions 331 and 333 of the subframe 302 with the longitudinal members 305 and 308, respectively, of the battery pack 110 with a different implementation of the structural attachment member 300 or without a separate structural attachment member. For example, a battery-subframe assembly may be provided with other types of joints between the battery pack 110 and the subframe 302 in various other examples. As examples, the structural attachment member 300 may be formed as an integral portion of the pack frame 205 and may include features (e.g., as described herein) for attachment to the subframe 302, the structural attachment member 300 may be formed as an integral feature of the subframe 302 and may include features (e.g., as described herein) for attachment to the pack frame 205, or the subframe 302 and the pack frame 205 may each include integral features configured for direct attachment of the subframe 302 to the pack frame 205 with the longitudinal portions 331 and 333 of the subframe 302 aligned with the longitudinal members 305 and 308, respectively, of the battery pack 110.

In the example of FIG. 3, two structural attachment members 300 are provided at the ends of two longitudinal members of the battery pack 110. In other implementations, more than two or less than two structural attachment members 300 may be provided, such as in alignment with more than two or less than two longitudinal members of the battery pack 110. Providing two or more structural attachment members 300, such as in alignment with the ends of two or more longitudinal members of the battery pack 110, may help to increase the torsional and bending stiffness of the vehicle 100 using the battery pack 110 (e.g., the torsional and bending stiffness of the pack frame 205, which may also be formed from a rigid metal, such as steel or aluminum).

Figure 4:
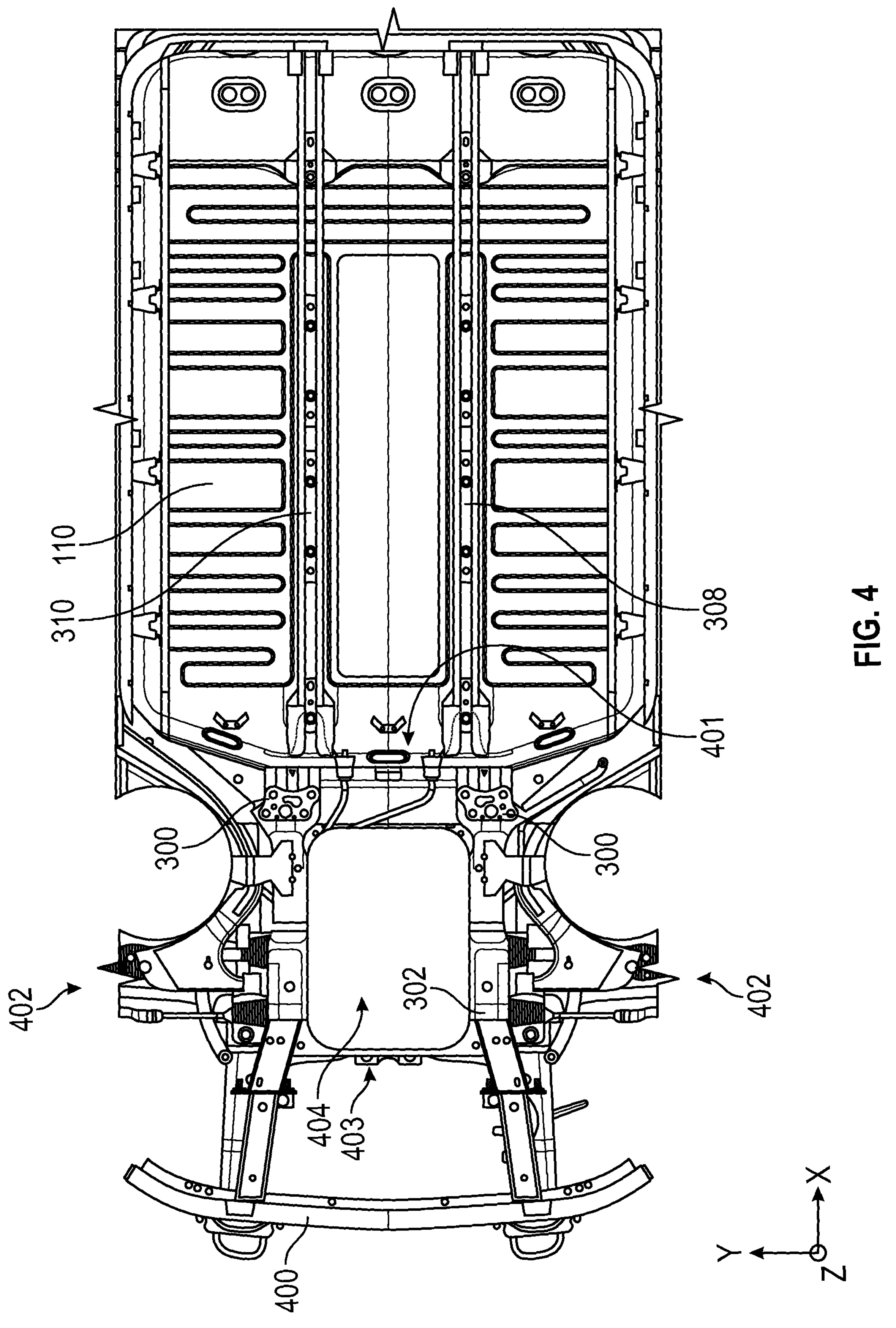
FIG. 4 illustrates a top view of an arrangement of vehicle components including a subframe, a structural attachment member, a battery pack, and a bumper structure in accordance with one or more implementations.

In one or more implementations, the subframe 302 may be a front subframe of the vehicle 100. As shown in FIG. 4, the structural attachment members 300 may each be attached to a first end 401 of the subframe 302, opposite a second end 403 of the subframe 302. As shown, the second end 403 of the subframe 302 may be coupled to (e.g., attached to) a bumper structure 400 (e.g., for a front bumper 135) of the vehicle 100. FIG. 4 also illustrates how the subframe 302 may be disposed between two wheel mounts 402 for the front wheels 102 of the vehicle 100. The subframe 302 may also define an opening 404. The opening 404 may be configured to receive or otherwise accommodate one or more motors (e.g., electric motors) for the vehicle 100 (e.g., for powering the wheels 102 of the vehicle 100. In this way, the subframe 302 (e.g., which may extend from a front end of the vehicle to at or near a beginning of a passenger compartment of the vehicle) may be different from a typical vehicle frame that substantially spans the length and width of the vehicle, or at least a central portion of the vehicle.

Figure 5:
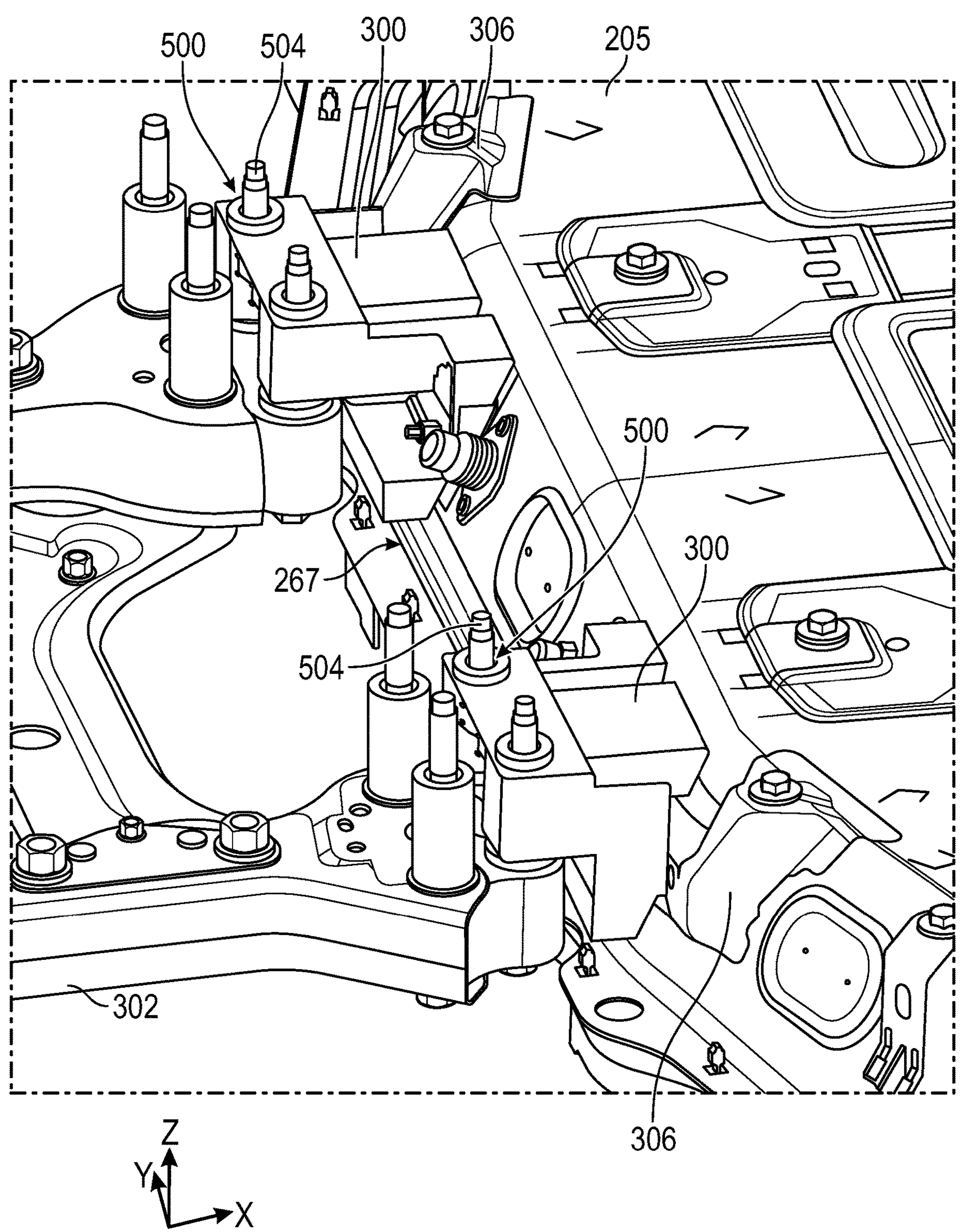
FIG. 5 illustrates a top perspective view of a structural attachment member coupled between a subframe and a battery pack in accordance with one or more implementations.

FIG. 5 illustrates a top perspective view of a portion of the vehicle components shown in FIGS. 3 and 4. For example, FIG. 5 illustrates how the brackets 306 may be attached to the pack frame 205 at the front end 267, the structural attachment members 300 may be attached to the brackets 306, and the subframe 302 may be attached to the structural attachment members 300. FIG. 5 also shows how the structural attachment members 300 may each include one or more attachment features 500 for attachment of the subframe 302 to the structural attachment members 300. In the example of FIG. 5, the attachment features 500 are implemented as openings in the structural attachment member 300. For example, as shown, the openings in the structural attachment member 300 may each be configured to receive a bolt 504 that passes through the subframe 302 and through the opening in the structural attachment member 300, to attach the subframe 302 to the structural attachment member 300. For example, the bolts 504 may be configured to pass through a portion of the subframe 302, through a portion of the structural attachment member 300, and into a body structure (not shown in FIG. 5) of the vehicle 100. As illustrated in FIG. 5, in one or more implementations, the bolts 504 may be installed along the Z direction (e.g., vertically). However, this is merely illustrative, and in other implementations (see, e.g., the examples of FIGS. 11-15 discussed hereinafter), the bolts 504 may be installed in the Y or X directions (e.g., depending on the assembly process/ sequence for assembling the vehicle).

Figure 6:
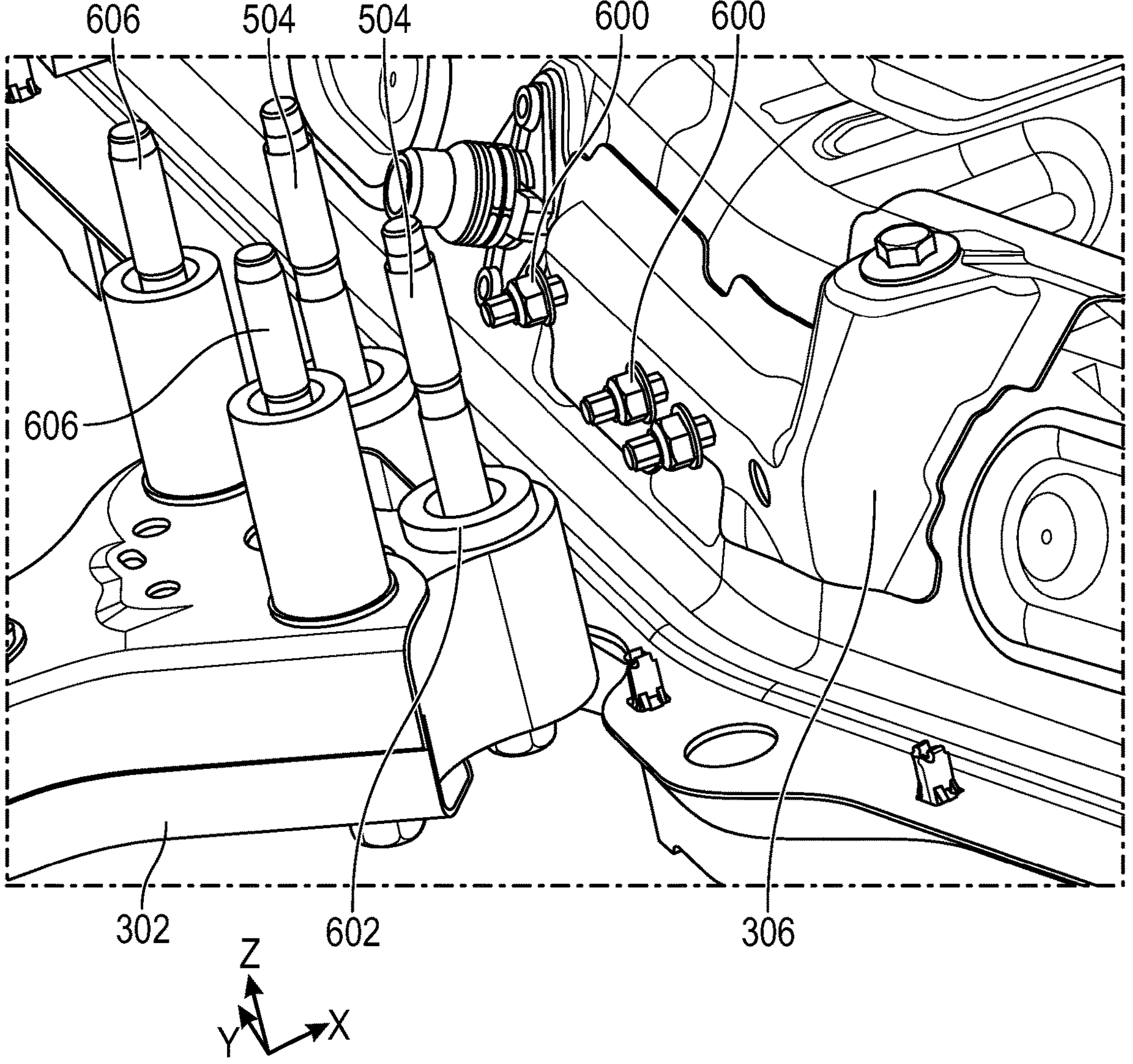
FIG. 6 illustrates the top perspective view of the vehicle components of FIG. 5, with the structural attachment member removed, in accordance with one or more implementations.

FIG. 6 illustrates a top perspective view of a portion of the vehicle components shown in FIG. 5, with the structural attachment member 300 removed to provide a view of the bracket 306. As shown, the subframe 302 may be provided with sliding bushings 602 through which the bolt 504 pass. The sliding bushings 602 may be provided to manage assembly variations (e.g., to provide an increased margin during alignment of parts, and a tightened margin when the parts are attached, or bolted, together through the sliding bushings). As discussed herein, the bolts 504 may be configured to extend into a body structure (not shown) of a vehicle, such as the vehicle 100. FIG. 6 also shows additional bolts 606 that may be provided for attaching the subframe 302 to the body structure of the vehicle separately from the structural attachment member 300.

As shown in FIG. 6, the bracket 306 may be provided with one or more attachment features 600. The attachment features 600 may be configured for attaching the structural attachment member 300 to the pack frame 205 of the battery pack 110. In the example of FIG. 6, the attachment features 600 are implemented as a set of bolts extending, in the X direction, from the bracket 306. In one or more implementations, the structural attachment member 300 may be attached to the bracket 306 via the bolts corresponding to the attachment features 600, prior to attaching the subframe 302 to the structural attachment member 300.

Figure 7:
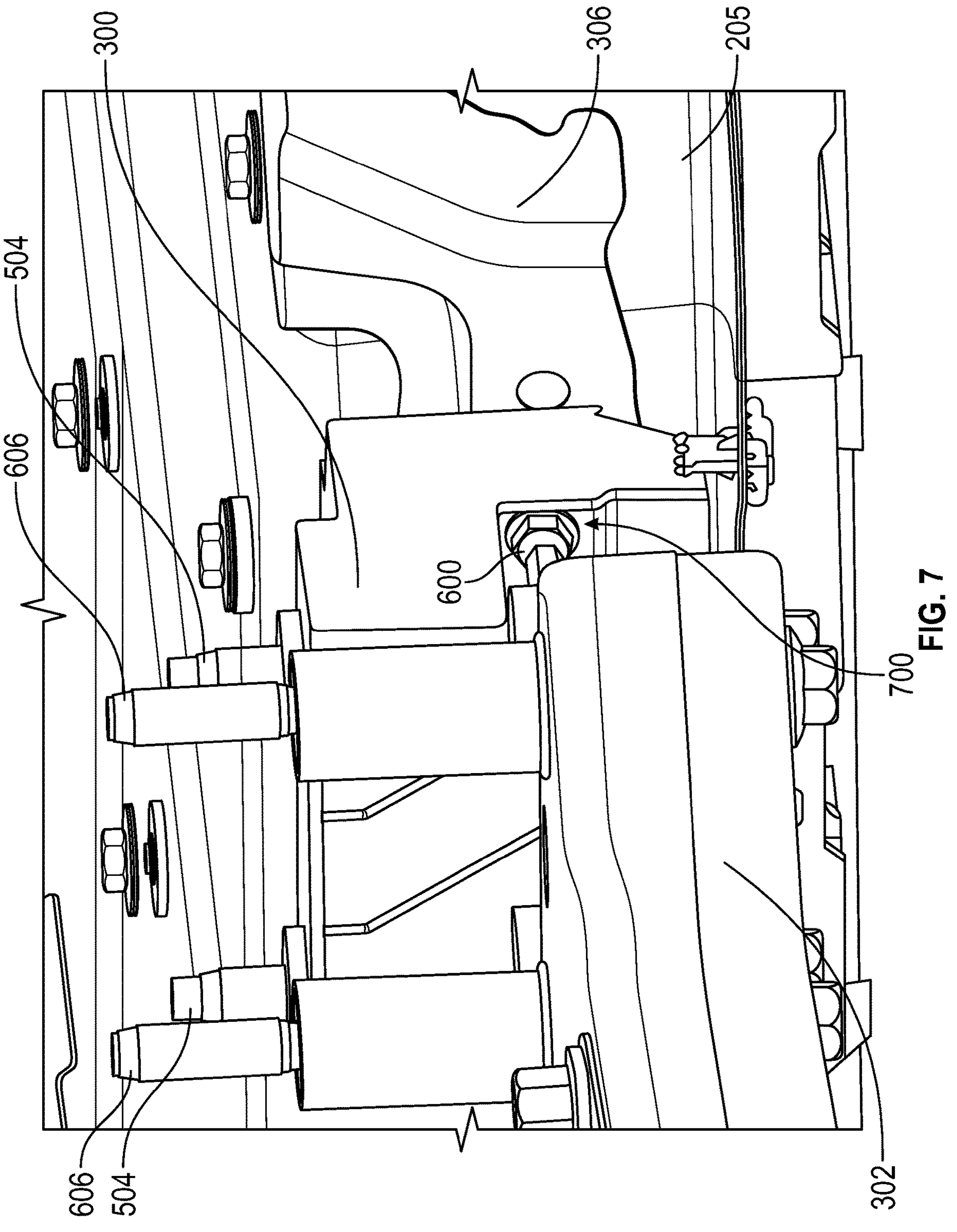
FIG. 7 illustrates a side perspective view of a structural attachment member coupled between a subframe and a battery pack in accordance with one or more implementations.

For example, FIG. 7 shows a side perspective view in which the bolts, corresponding to the attachment features 600 and extending from the bracket 306, attach the structural attachment member 300 to the bracket 306 and thereby to the pack frame 205. As shown, the structural attachment member 300 may include one or more attachment features 700 (e.g., openings) configured to mate with the attachment features 600 (e.g., bolts) on the battery pack 110. In various examples described herein, a bracket 306 is attached to the exterior of the pack frame 205 and provided with attachment features 600 for attaching the structural attachment member 300 to the pack frame 205. However, this is merely illustrative and, in one or more other implementations, the attachment features 600 for attaching the structural attachment member 300 to the pack frame 205 may be provided directly on the pack frame 205 (e.g., using stamped or molded features on the pack frame 205).

Figure 8:
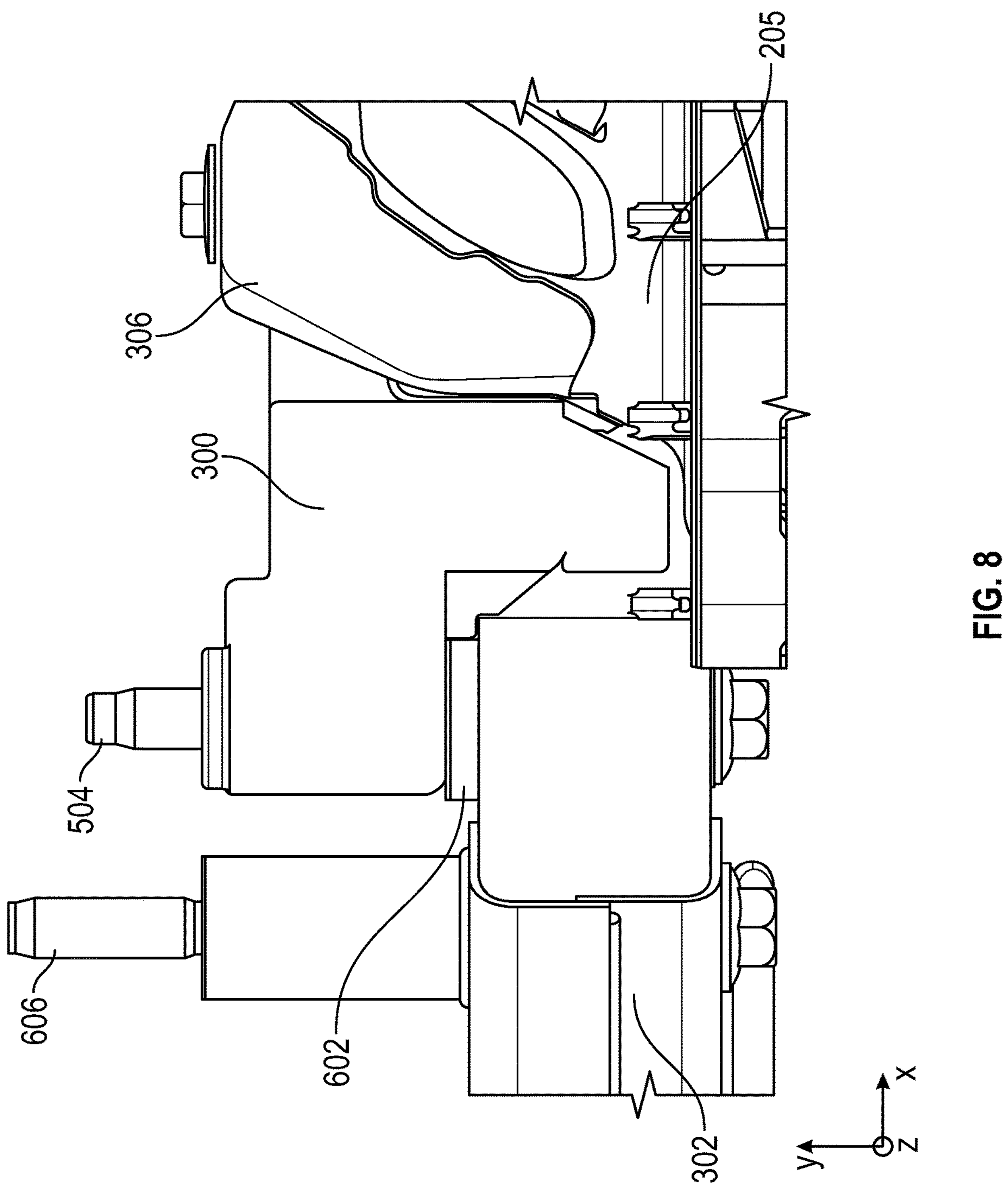
FIG. 8 illustrates a side view of a structural attachment member coupled between a subframe and a battery pack in accordance with one or more implementations.
Figure 9:
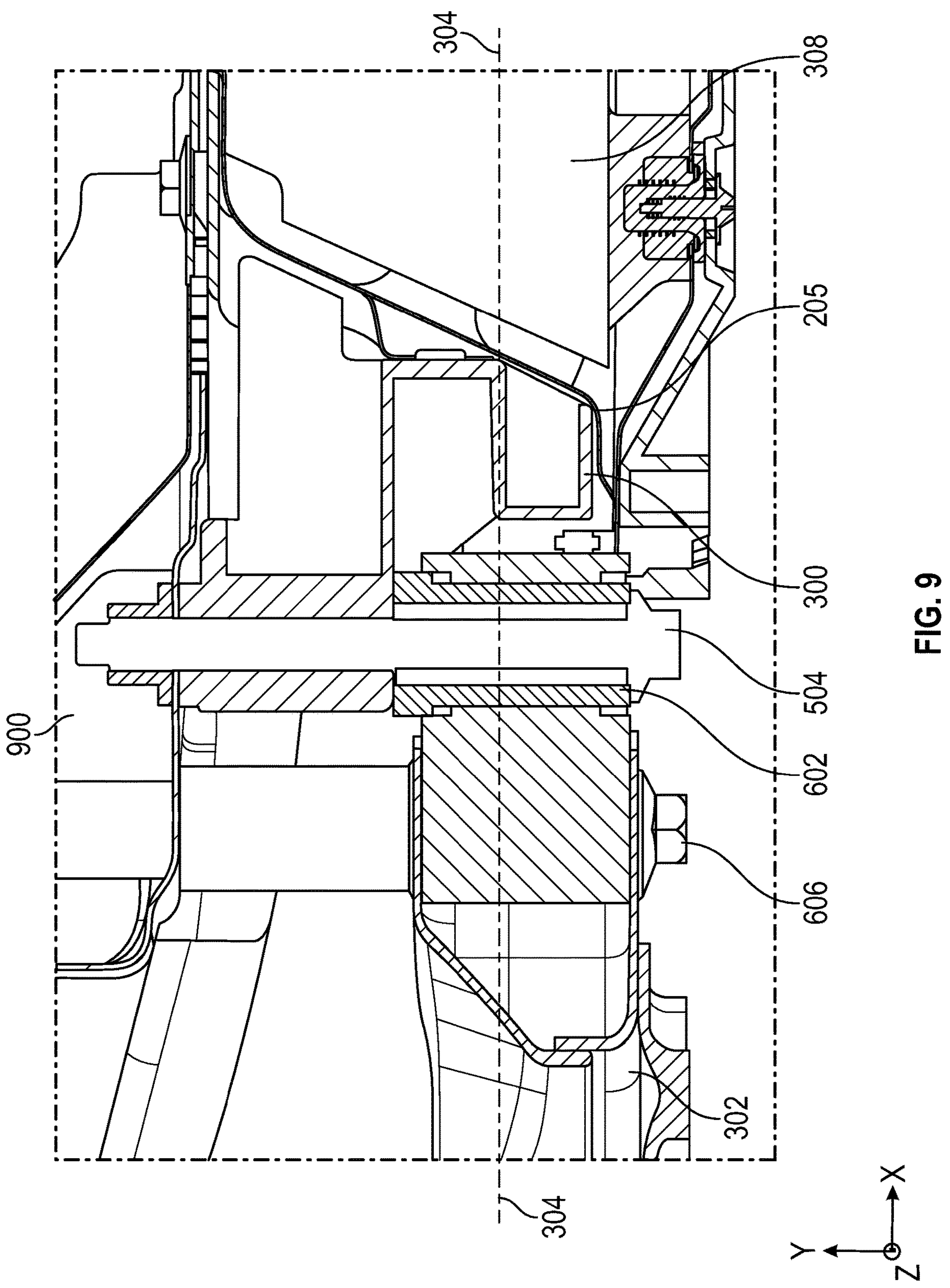
FIG. 9 illustrates a cross-sectional side view of a structural attachment member coupled between a subframe and a battery pack in accordance with one or more implementations.

FIG. 8 illustrates a side view of the structural attachment member 300 coupled between the pack frame 205 and the subframe 302 by the bolt 504 that passes through the sliding bushing 602 and through the openings in the structural attachment member 300. FIG. 9 illustrates a cross-section through the side view of FIG. 8, with a body structure 900 of the body of the vehicle 100 shown. For example, the arrangement of FIG. 9 may be an arrangement of the illustrated vehicle components in a body-in-white (BIW) stage, or in a completely assembled vehicle (as examples). As shown, the bolts 504 may pass through the sliding bushing 602 mounted in the subframe 302, through the openings in the structural attachment member 300, and into the body structure 900, to attach the subframe 302 to the structural attachment member 300 and to the body structure 900. The load path 304 of FIG. 3 is also shown in FIG. 9, passing along a continuous line through the subframe 302, the structural attachment member 300, and the longitudinal member 308 of the battery pack 110.

FIG. 9 also illustrates another benefit that may be provided by the structural attachment member 300. For example, in a vehicle in which a battery pack is attached to a vehicle frame that substantially spans the length and/or width of the vehicle (e.g., include a middle portion of the vehicle under the passenger compartment), in order to service the vehicle frame or the battery pack, the battery pack often must be entirely removed from the vehicle. This can be a time consuming and costly process in some cases. By attaching the battery pack 110 to the subframe 302 using the structural attachment member 300, serviceability of the vehicle may be enhanced by providing the ability to remove the subframe 302 without removing the battery pack 110 (e.g., by removing the bolts 504, and thereby decoupling the subframe 302 from the battery pack 110, while the battery pack 110 remains attached to the body of the vehicle at one or more other locations), and/or to remove the battery pack 110 without removing the subframe 302 (e.g., by removing the bolts 504 and, thereby decoupling the subframe 302 from the battery pack 110, while the subframe remains attached to the body of the vehicle at one or more other locations).

Figure 10:
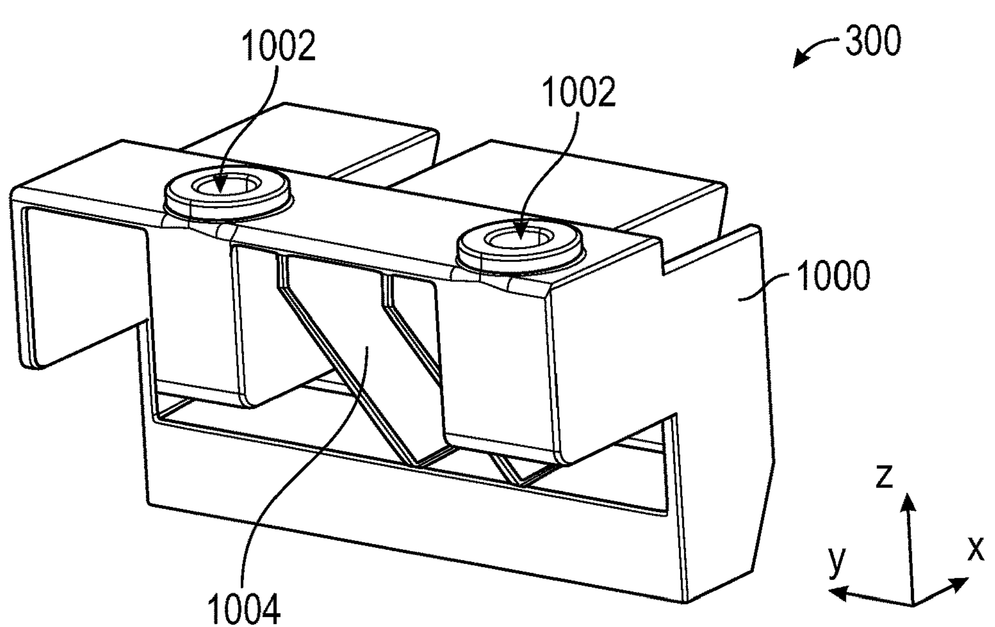
FIG. 10 illustrates a perspective view of the structural attachment member of FIGS. 3-9 in accordance with one or more implementations.

FIG. 10 illustrates a perspective view of the structural attachment member 300 of FIGS. 3-5 and 7-9. In the example, of FIG. 10, the structural attachment member 300 includes a body 1000, and openings 1002 (corresponding to the attachment features 500) for the bolts 504. As shown, the body 1000 of the structural attachment member 300 may also include ribbing 1004, and/or other structural features, that increase the strength of the structural attachment member 300.

In various implementations, the body 1000 of the structural attachment member 300 may each be formed from steel, aluminum, reenforced polymers (e.g., reinforced plastics), any combination thereof, and/or other materials. In various implementations, the structural attachment members 300 may formed from casting, forging, molding, stamping, combinations thereof, and/or other formation methods/operations. The materials, formation processes, size, structure, ribbing, and/or other features of the structural attachment member 300 can be adjusted based on a magnitude of a load (e.g., a maximum load) that the structural attachment member 300 is configured to withstand and/or pass to the longitudinal members of the battery pack.

Various examples have been described herein in which bolts 504 for attaching the subframe 302 to the structural attachment member 300 are installed along the Z direction (e.g., vertically with respect to the vehicle). However, other implementations of the structural attachment member 300 are contemplated herein. For example, in various other implementations, the structural attachment member 300 may be configured such that bolts, such as the bolts 504, are installed along the Y direction.

Figure 11:
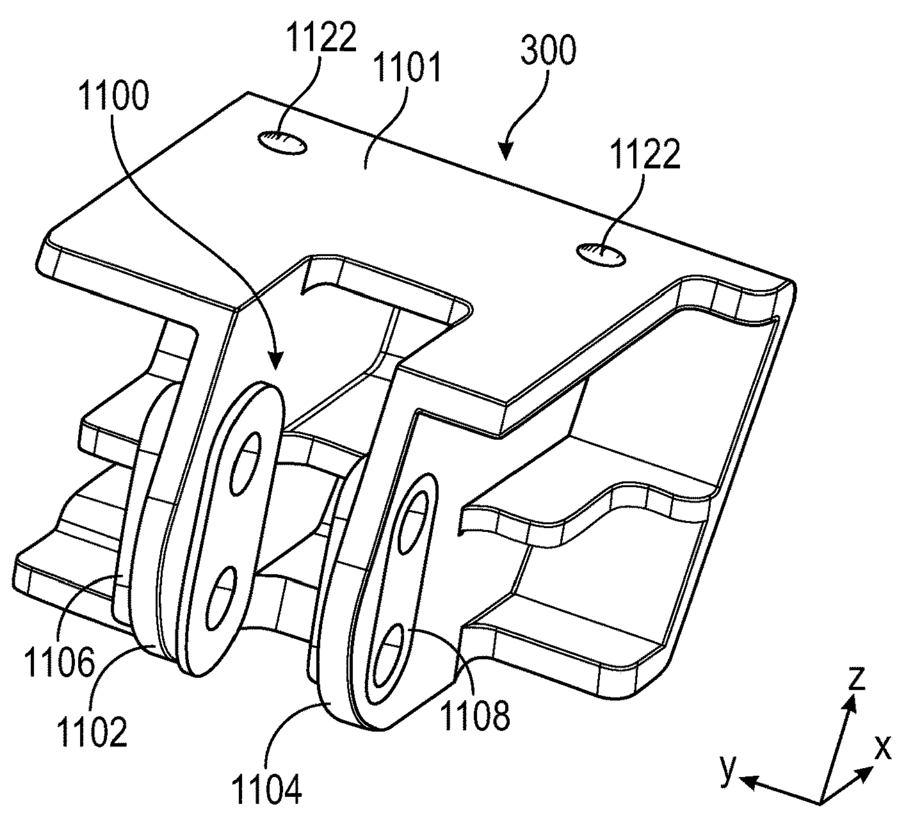
FIG. 11 illustrates a perspective view of first alternative implementation of a structural attachment member in accordance with one or more implementations.

For example, FIG. 11 illustrates a perspective view of another example implementation of the structural attachment member 300. In the example of FIG. 11, a body of the structural attachment member 300 includes a first vertical wall 1102 and a second vertical wall 1104, each extending along the X direction (e.g., away from the pack frame 205 when the structural attachment member 300 at mounted to the pack frame 205). In this example, a sliding bushing 1106 is provided in the vertical wall 1102, and a sliding bushing 1108 is provided in the vertical wall 1104. In this example, each of the sliding bushings 1106 and 1108 include two parallel openings configured to receive two respective bolts 504. In the arrangement of FIG. 11, a portion of the subframe 302 can be inserted into a gap 1100 between the vertical wall 1102 and the vertical wall 1104, and the bolts 504 can then be inserted, along the Y direction through the openings in the sliding bushings 1106 and 1108, to secure the subframe 302 to the structural attachment member 300. In this example, a top surface 1101 of the structural attachment member 300 includes openings 1122 that can be used to attach the structural attachment member 300 to the pack frame 205 (to a plate that extends from the pack frame, as described in further detail hereinafter). In one or more implementations, the openings 1122 may also be used to attach the structural attachment member 300 to one or more body structures of the vehicle, such as to the body structure 900 of FIG. 9.

Figure 12:
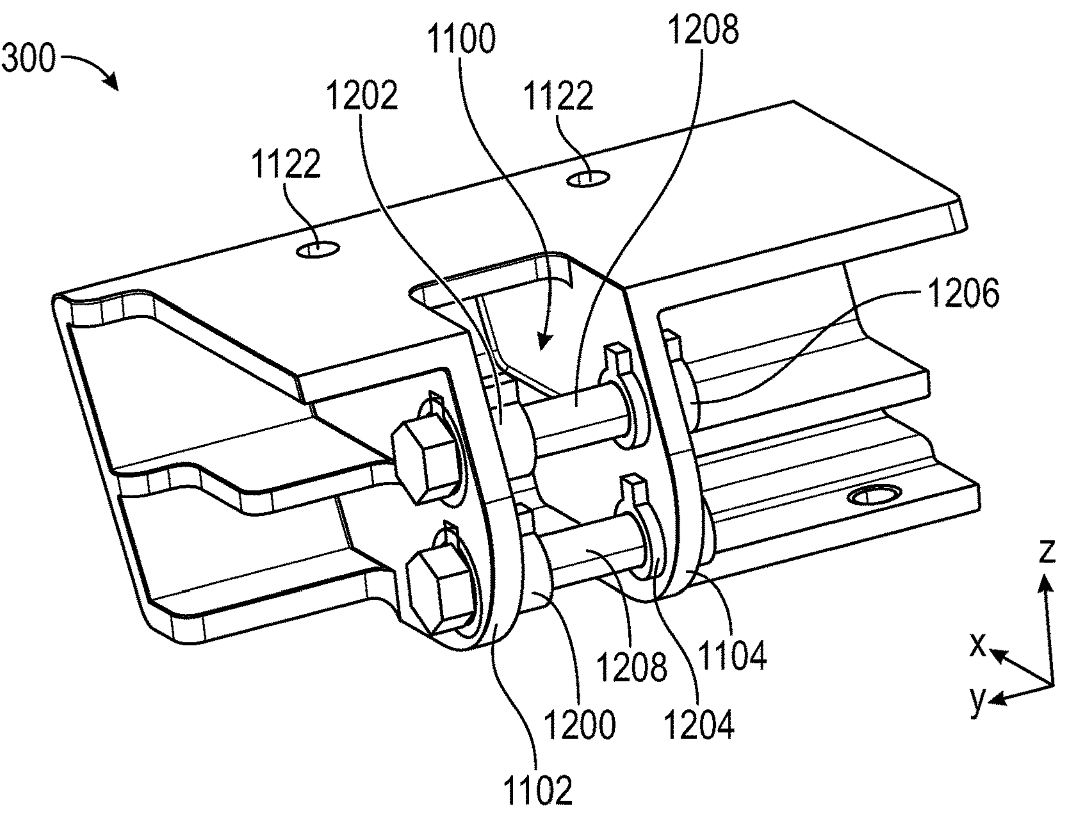
FIG. 12 illustrates a perspective view of a second alternative implementation of a structural attachment member in accordance with one or more implementations.

In the example of FIG. 11, the sliding bushing 1106 includes two openings, with each opening configured to receive one of the bolts 504. The sliding bushing 1108 includes two openings, parallel with the two openings in the sliding bushing 1106, and each configured to receive one of the bolts 504. FIG. 12 illustrates another example implementation of the structural attachment member 300, in which the vertical wall 1102 and the vertical wall 1104 are each provided with two openings and each opening in the vertical walls 1102 and 1104 is provided with its own sliding bushing. For example, as shown, a sliding bushing 1200 may be provided in a first opening in the vertical wall 1102, a sliding bushing 1202 may be provided in a second opening in the vertical wall 1102, a sliding bushing 1204 may be provided in a first opening in the vertical wall 1104, and a sliding bushing 1206 may be provided in vertical wall a second opening in the vertical wall 1104. As shown, bolts 1208 may extend through the openings in the vertical walls 1102 and 1104 (e.g., through the sliding bushings 1200 and 1204 and the sliding bushings 1202 and 1206, as shown).

Figure 13:
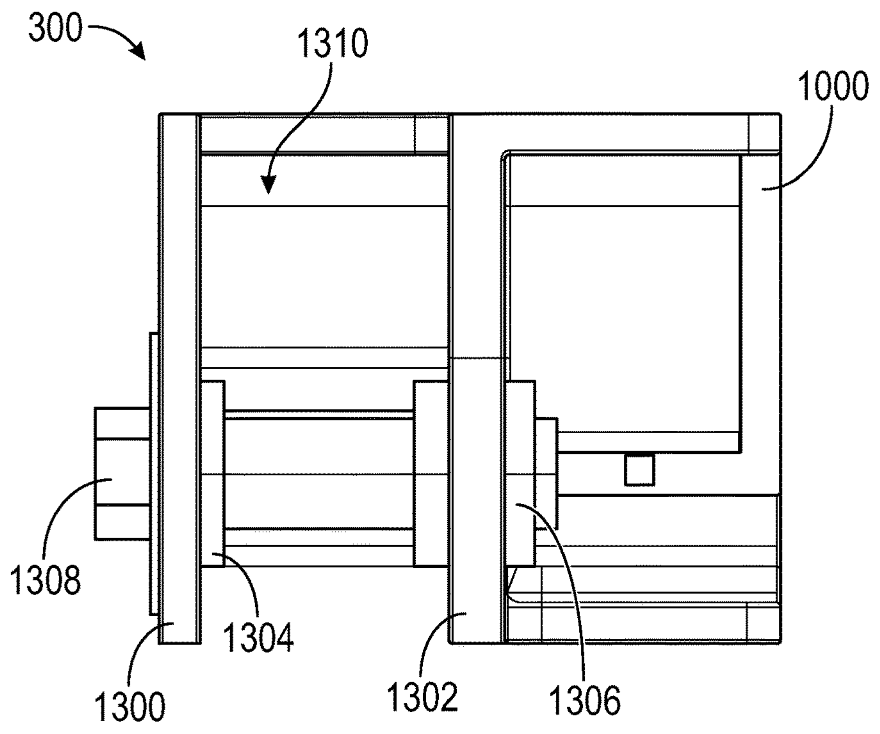
FIG. 13 illustrates a front view of a third alternative implementation of a structural attachment member in accordance with one or more implementations.
Figure 14:
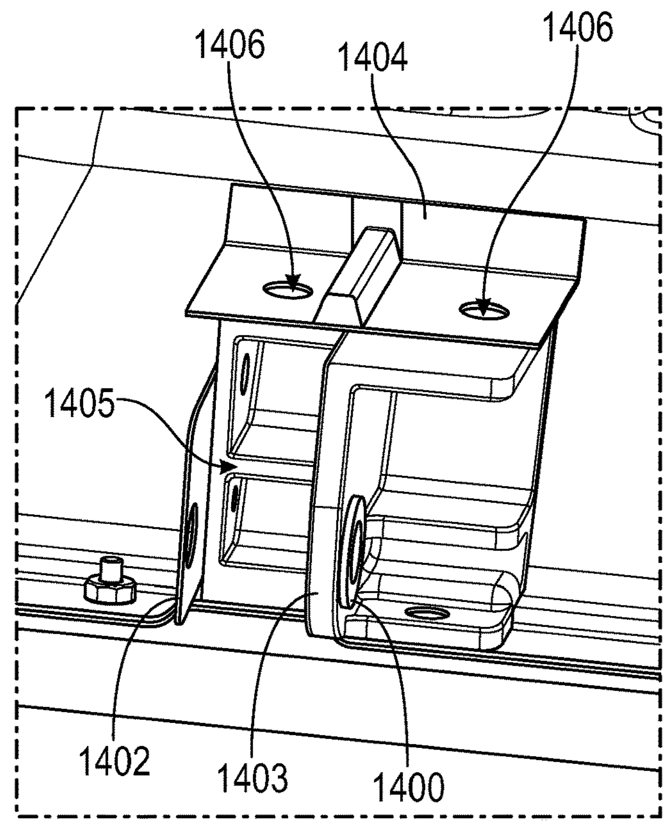
FIG. 14 illustrates a perspective view of a fourth alternative implementation of a structural attachment member in accordance with one or more implementations.
Figure 15:
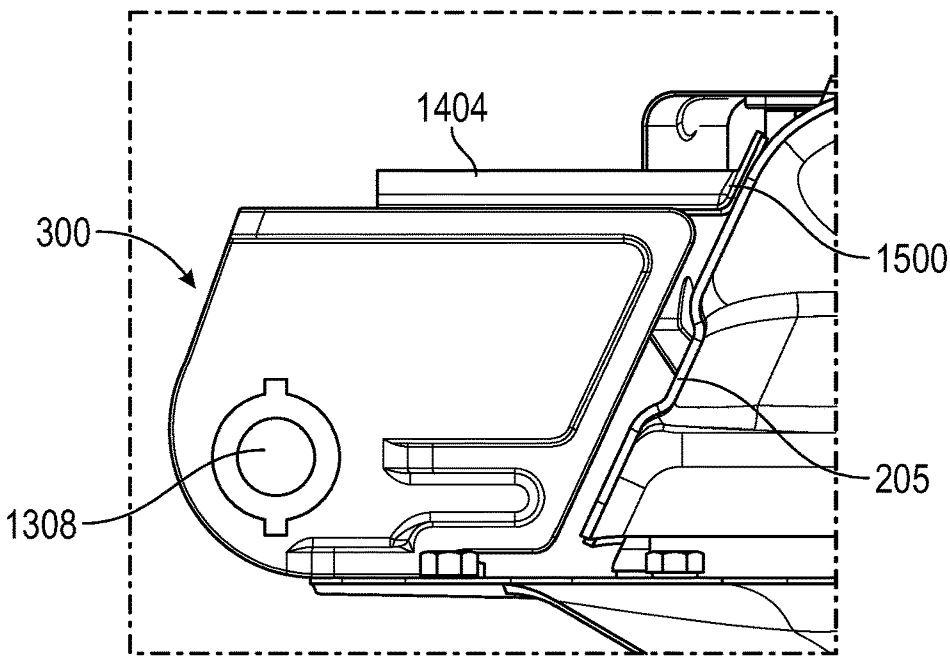
FIG. 15 illustrates a side view of the structural attachment member of FIG. 14 in accordance with one or more implementations.

In the examples of FIGS. 10-12, the structural attachment member 300 is configured to receive multiple (e.g., two) bolts 504. However, in other implementations, the structural attachment member 300 may be configured to receive less than two bolts, or more than two bolts for attaching the subframe 302 to the structural attachment member 300. For example, FIGS. 13-15 illustrate other implementations of the structural attachment member 300, in which a single bolt is used to attach the subframe 302 to the structural attachment member 300. For example, FIG. 13 illustrates a front view of an implementation of the structural attachment member 300 in which a vertical wall 1300 is provided with a single opening having a sliding bushing 1304, and a vertical wall 1302 is provided with a single opening having a sliding bushing 1306. In this example, a single bolt 1308 may be used to secure a portion of the subframe 302 within a gap 1310 between the vertical wall 1300 and the vertical wall 1302.

FIG. 14 illustrates a front view of another exemplary implementation of the structural attachment member 300, in which an end plate 1402 (e.g., a metal plate) is attached to one end of the structural attachment member 300. In this example, the end plate 1402 is provide with an opening, and the structural attachment member 300 includes a vertical wall 1403 extending in parallel with the end plate 1402. As shown, the vertical wall 1403 may be provided with a single opening that is aligned with the opening in the end plate 1402 and that has a sliding bushing 1400 disposed therein. In this example, as in the example of FIG. 13, a single bolt (e.g., bolt 1308) may be used to secure a portion of the subframe 302 within a gap 1405 between the end plate 1402 and the vertical wall 1403.

FIG. 14 also illustrates another implementation of an attachment between the structural attachment member 300 to the pack frame 205. In the example of FIG. 14, an additional plate (e.g., plate 1404) may be attached to (e.g., welded to) the pack frame 205. As shown, the plate 1404 may be provided with one or more openings 1406 that align with openings 1122 (see, e.g., FIGS. 11 and 12) on a top surface of the structural attachment member 300. In this example, bolts (or other fasteners) may pass through the openings 1406 into the openings 1122 to secure the structural attachment member 300 to the pack frame 205 and/or one or more body structures of the vehicle, such as to the body structure 900 of FIG. 9. FIG. 15 illustrates a side view of the structural attachment member 300 of FIG. 14 attached to the pack frame 205 by the plate 1404. In the example of FIG. 15, weld point 1500 between the plate 1404 and the pack frame 205 can be seen. In one or more other implementations, the plate 1404 may be bolted or otherwise fastened to the pack frame 205, or may be an integral part (e.g., an extension) of the pack frame 205 itself.

Figure 16:
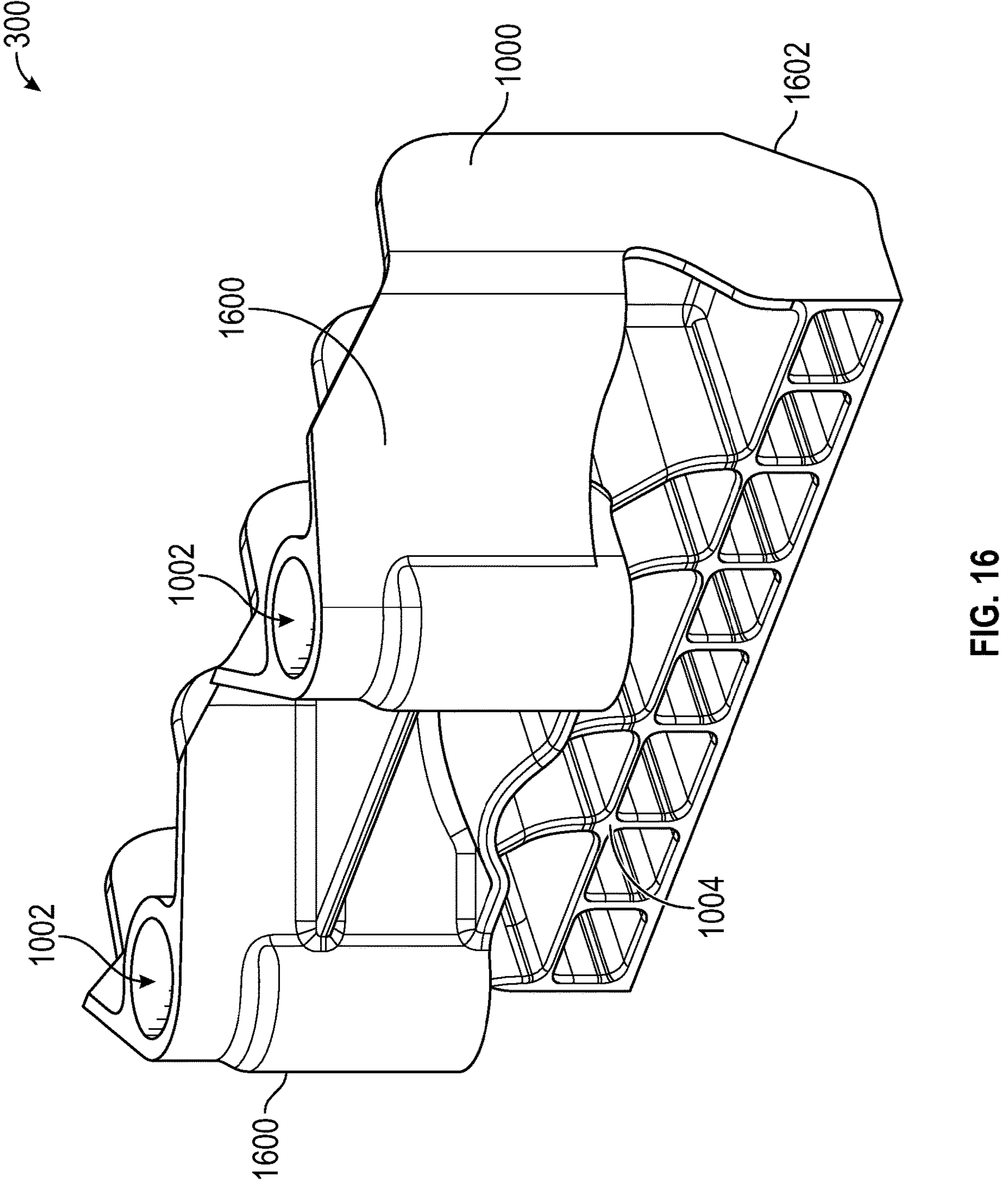
FIG. 16 illustrates a perspective view of a fifth alternative implementation of a structural attachment member in accordance with one or more implementations.
Figure 17:
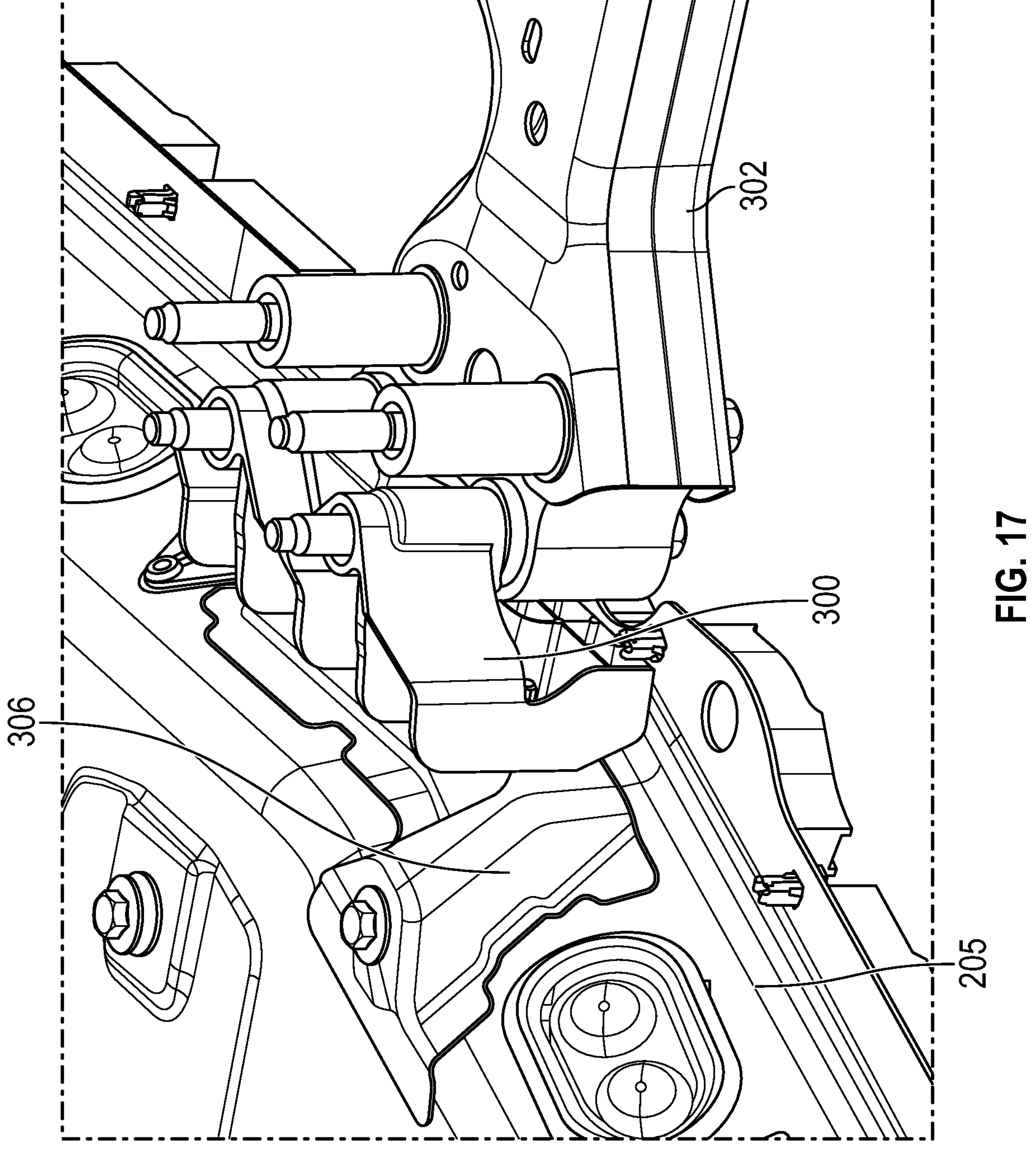
FIG. 17 illustrates an top perspective view of the structural attachment member of FIG. 16 coupled between a subframe and a battery pack in accordance with one or more implementations.

FIG. 16 illustrates another example implementation of the structural attachment member 300. In the example of FIG. 16, the body 1000 of the structural attachment member 300 may have a reduced mass relative to the body 1000 shown in FIG. 10. In this example, the body 1000 of the structural attachment member 300 includes the openings 1002 disposed in a pair of arms 1600 that extend from a base portion 1602 of the body 1000. As shown, ribbing 1004 may be provided on the base portion 1602 and/or between the arms 1600, to provide enhanced strength even with the reduced mass of the body 1000. FIG. 17 illustrates a perspective view of the structural attachment member 300 of FIG. 16 coupled between the battery pack 110 and the subframe 302 (e.g., using bolts 504 through the openings 1002, as described herein).

As illustrated by FIGS. 1-17, in one or more implementations, an apparatus (e.g., vehicle 100) may be provide with a structural attachment member 300 that is configured to attach a battery pack 110 for a vehicle 100 to a subframe 302 of the vehicle, and to provide a load path 304 from the subframe to the battery pack. The subframe 302 may be a front subframe of the vehicle, and the structural attachment member 300 may be configured to attach to a first end 401 of the front subframe, opposite a second end 403 of the front subframe, the second end 403 of the front subframe configured to couple to a front bumper 135 (e.g., bumper structure 400) of the vehicle 100. The load path 304 may be formed, at least in part, by an alignment of a longitudinal portion 331 of the subframe, the structural attachment member 300, and a longitudinal member 308 of the battery pack 110.

The structural attachment member 300 may include a first set of attachment features 700 (e.g., openings) for attaching the structural attachment member to a frame (e.g., pack frame 205) of the battery pack 110; and a second set of attachment features 500 for attaching the structural attachment member 300 to the subframe 302 of the vehicle 100. The second set of attachment features 500 may also be configured for attaching the structural attachment member 300 to the subframe 302 and to a body (e.g., body structure 900) of the vehicle 100. In one or more implementations, the second set of attachment features may include one or more sliding bushings (e.g., sliding bushings 1106, 1108, 1200, 1202, 1204, 1206, 1304, 1306, and/or 1400) configured to facilitate assembly of the structural attachment member 300 to the subframe 302, and torquing of one or more bolts (e.g., bolts 504 or 1308) for securing the structural attachment member 300 to the subframe 302.

In one or more implementations, the one or more sliding bushings may include multiple sliding bushings (e.g., as in the examples of FIGS. 11 and 12) configured to provide a bending strength for an assembly including the subframe 302, the structural attachment member 300, and the battery pack 110. In one or more implementations, the one or more sliding bushings may include a single sliding bushing 1400, and the second set of attachment features may include an end plate 1402 having an opening that is aligned with the single sliding bushing 1400.

In one or more implementations, the first set of attachment features 500 may include one or more openings 1122 configured to receive one or more bolts that pass through a plate 1404 attached to the frame of the battery pack. In one or more implementations, the first set of attachment features 700 may include one or more openings configured to receive one or more bolts (e.g., bolts corresponding to attachment features 600) that extend from a bracket 306 that is welded to the frame of the battery pack.

As illustrated by FIGS. 1-17, in one or more implementations, an apparatus (e.g., vehicle 100, or a subassembly thereof) may include a subframe 302 for a vehicle 100 and a battery pack 110 having a longitudinal member 308. A load path 304 may extend along a continuous line from the subframe 302 to the longitudinal member 308 of the battery pack 110. The apparatus may also include a structural attachment member 300 coupled between the subframe 302 and the battery pack 110. The continuous line may be a smoothly continuous line, and the structural attachment member 300 may form a portion of the load path 304, and may align a longitudinal portion 331 of the subframe 302 and the longitudinal member 308 of the battery pack 110 along the smoothly continuous line.

The subframe 302 may be attachable, at a first end 401, to the structural attachment member 300, and, at a second end 403, to a bumper 135 (e.g., bumper structure 400) of the vehicle 100. The structural attachment member 300 may be attached to a first end (e.g., front end 267) of a frame (e.g., pack frame 205) of the battery pack 110. The battery pack 110 may include, attached to the frame at or near a second end (e.g., rear end 269) of the frame, a modular enclosure 290 for one or more electrical components (e.g., electronic components for routing power from the battery pack 110 to one or more portions of the vehicle 100).

The subframe 302 may include a frame structure (e.g., longitudinal portion 331) that defines a first portion of the load path, the first portion coupled, via the structural attachment member 300, to a second portion of the load path 304 defined by the longitudinal member 308 of the battery pack 110. The load path 304 may include a first load path, and a second load path 305 may extend, in parallel with the first load path, along another smoothly continuous line from the subframe 302 to another longitudinal member 310 of the battery pack 110.

As illustrated by FIGS. 1-17, in one or more implementations, a vehicle, such as vehicle 100, may include a structural attachment member 300 configured to attach a battery pack 110 for the vehicle to a subframe 302 of the vehicle, and to provide a load path 304 from the subframe 302 to the battery pack 110. The vehicle may also include the battery pack 110 and a bracket 306 welded to a frame (e.g., pack frame 205) of the battery pack, the bracket 306 having one or more features 600 configured to secure the structural attachment member 300 to a frame (e.g., pack frame 205) of the battery pack 110. The vehicle may also include a vehicle body (e.g., body structure 900), and the subframe 302 may be configured to be mounted to the vehicle body via the structural attachment member 300. The subframe 302 may be detachable from the structural attachment member 300 and the battery pack 110, without removing the battery pack 110 from the vehicle 100 (e.g., by removing the bolts 504 and thereby decoupling the subframe 302 from the battery pack 110). The battery pack 110 may be removable from the vehicle 100 without removing the subframe 302 from the vehicle 100 (e.g., by removing the bolts 504 and thereby decoupling the subframe 302 from the battery pack 110).

In various implementations, the structural attachment member 300 may be formed from any material (e.g., metal/plastic) and/or any commodity (e.g., casting/forging/stamping/molding etc.) can be used for the joint interface. In various implementations, the fastener installation direction for the structural attachment member 300 can be in X, Y or Z, depending on the assembly process/sequence. In various implementations the size of the joint (e.g., the structural attachment member 300) can be amplified based on the magnitude of the load.

FIG. 18 illustrates a flow diagram of an example process 1800 that may be performed for assembling a vehicle, in accordance with implementations of the subject technology. For explanatory purposes, the process 1800 is primarily described herein with reference to the vehicle 100 and structural attachment member 300 of FIGS. 1-17. However, the process 1800 is not limited to the vehicle 100 and structural attachment member 300, and one or more blocks (or operations) of the process 1800 may be performed by or with one or more other structural components of other suitable moveable apparatuses, devices, or systems. Further for explanatory purposes, some of the blocks of the process 1800 are described herein as occurring in serial, or linearly. However, multiple blocks of the process 1800 may occur in parallel. In addition, the blocks of the process 1800 need not be performed in the order shown and/or one or more blocks of the process 1800 need not be performed and/or can be replaced by other operations.

As illustrated in FIG. 1800, at block 1802, a battery pack (e.g., battery pack 110) may be provided. Providing the battery back may include obtaining the battery pack from a supplier, and/or assembling some or all the battery pack (e.g., by providing one or more battery cells 120 and/or one or more battery modules 115 in a pack frame 205 having one or more longitudinal members, such as longitudinal members 308 and 310).

At block 1804, a subframe (e.g., subframe 302) may be provided. Providing the subframe may include obtaining the subframe from a supplier or manufacturing the subframe (e.g., using stamping, welding, casting, and/or other manufacturing processes for structural and/or metal components).

At block 1806, a structural attachment member (e.g., structural attachment member 300) may be mounted to the battery pack. Mounting the structural attachment member to the battery pack may include coupling one or more attachment features on the battery pack (e.g., one or more attachment features 600, such as bolts, on a bracket 306 on the battery pack as in FIG. 7, and/or one or more openings 1406 in a plate 1404 attached to the battery pack as in FIGS. 14 and/or 15) with one or more attachment features (e.g., attachment features 700 or openings 1122) on the structural attachment member.

At block 1808, a load path (e.g., load path 304 or load path 305) may be formed from a subframe (e.g., subframe 302) to the battery pack (e.g., battery pack 110) by attaching the subframe to the battery pack via the structural attachment member. For example, attaching the subframe to the battery pack via the structural attachment member may include inserting one or more bolts (e.g., bolts 504, 1208, and/or 1308) through one or more openings in the structural attachment member. For example, one or more bolts 504 may be inserted through one or more openings in the subframe, through one or more aligned openings in the structural attachment member, and into a body structure (e.g., body structure 900) for the vehicle. As another example, a portion of the subframe may be inserted into a gap (e.g., gap 1100, 1310, or 1405) between two vertical walls (see, e.g., FIGS. 11-13) and/or between a vertical wall and an end plate (see, e.g., FIG. 14) of the structural attachment member, and inserting one or more bolts (e.g., bolts 504, 1208, or 1308) through one or more openings (e.g., and one or more sliding bushings) in the vertical wall(s) and/or end plate.

FIG. 19 illustrates a flow diagram of an example process 1900 that may be performed for servicing a vehicle, in accordance with implementations of the subject technology. For explanatory purposes, the process 1900 is primarily described herein with reference to the vehicle 100 and structural attachment member 300 of FIGS. 1-17. However, the process 1900 is not limited to the vehicle 100 and structural attachment member 300, and one or more blocks (or operations) of the process 1900 may be performed by or with one or more other structural components of other suitable moveable apparatuses, devices, or systems. Further for explanatory purposes, some of the blocks of the process 1900 are described herein as occurring in serial, or linearly. However, multiple blocks of the process 1900 may occur in parallel. In addition, the blocks of the process 1900 need not be performed in the order shown and/or one or more blocks of the process 1900 need not be performed and/or can be replaced by other operations.

As illustrated in FIG. 1900, at block 1902, a subframe (e.g., subframe 302) of a vehicle (e.g., vehicle 100) may be detached from a body (e.g., body structure 900) of the vehicle and from a structural attachment member (e.g., structural attachment member 300) that is attached to a battery pack (e.g., battery pack 110) of the vehicle. For example, detaching the subframe from the body may include removing one or more bolts (e.g., bolts 504, 1208, and/or 1308) that attach the subframe and the structural attachment member to the body, and/or that attach the subframe to the structural attachment member.

At block 1904, the subframe may be removed from the vehicle without removing the battery pack from the body of the vehicle. For example, the battery pack may be attached to the body of the vehicle at one or more locations other than the attachment provided by the structural attachment member. In one or more implementations, the subframe may also be attached to the body of the vehicle at one or more locations other than the attachment provided by the structural attachment member (e.g., by bolts 606). Removing the subframe may include detaching the subframe from the body of the vehicle at the one or more other locations (e.g., by removing the bolts 606).

In one or more implementations, a method for servicing a vehicle may also, or alternatively, include removing the battery pack from the vehicle without removing the subframe from the vehicle. For example, FIG. 20 illustrates a flow diagram of an example process 2000 that may be performed for servicing a vehicle, in accordance with implementations of the subject technology. For explanatory purposes, the process 2000 is primarily described herein with reference to the vehicle 100 and structural attachment member 300 of FIGS. 1-17. However, the process 2000 is not limited to the vehicle 100 and structural attachment member 300, and one or more blocks (or operations) of the process 2000 may be performed by or with one or more other structural components of other suitable moveable apparatuses, devices, or systems. Further for explanatory purposes, some of the blocks of the process 2000 are described herein as occurring in serial, or linearly. However, multiple blocks of the process 2000 may occur in parallel. In addition, the blocks of the process 2000 need not be performed in the order shown and/or one or more blocks of the process 2000 need not be performed and/or can be replaced by other operations.

As illustrated in FIG. 20, at block 2002, a battery (e.g., battery pack 110 and/or another battery assembly or subassembly) of a vehicle (e.g., vehicle 100) may be detached from a body (e.g., body structure 900) of the vehicle and from a structural attachment member (e.g., structural attachment member 300) that is attached to a subframe of the vehicle. For example, detaching the battery from the body may include removing one or more bolts (e.g., bolts 504, 1208, and/or 1308) that attach the battery and the structural attachment member to the body, and/or that attach the battery to the structural attachment member.

At block 2004, the battery may be removed from the vehicle without removing the subframe from the body of the vehicle. For example, the subframe may be attached to the body of the vehicle at one or more locations other than the attachment provided by the structural attachment member. In one or more implementations, the battery may also be attached to the body of the vehicle at one or more locations other than the attachment provided by the structural attachment member (e.g., by one or more additional bolts or other fasteners, which may be located around a periphery of a frame of the battery, such as the pack frame 205 of the battery pack 110). Removing the battery may include detaching the battery from the body of the vehicle at the one or more other locations (e.g., by removing the one or more additional bolts or other fasteners).

Aspects of the subject technology can help improve the reliability and/or range of electric vehicles. This can help facilitate the functioning of and/or proliferation of electric vehicles, which can positively impact the climate by reducing greenhouse gas emissions.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

Those of skill in the art would appreciate that the various illustrative blocks, modules, elements, components, methods, and algorithms described herein may be implemented as hardware, electronic hardware, computer software, or combinations thereof. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. An apparatus, comprising:
- a structural attachment member configured to:
  - attach a battery pack for a vehicle to a subframe of the vehicle, and
  - provide a load path from the subframe to the battery pack;
- wherein the structural attachment member comprises:
  - a first set of attachment features for attaching the structural attachment member to the battery pack, and
  - a second set of attachment features for attaching the structural attachment member to the subframe of the vehicle; and
- wherein the load path is substantially aligned in a longitudinal direction of the vehicle.

2. The apparatus of claim 1, wherein the subframe comprises a front subframe of the vehicle, and wherein the structural attachment member is configured to attach to a first end of the front subframe, opposite a second end of the front subframe, the second end of the front subframe configured to couple to a front bumper of the vehicle.

3. The apparatus of claim 1, wherein the load path is formed, at least in part, by an alignment of a longitudinal portion of the subframe, the structural attachment member, and a longitudinal member of the battery pack.

4. The apparatus of claim 1, wherein the second set of attachment features are configured for attaching the structural attachment member to the subframe and to a body of the vehicle.

5. The apparatus of claim 1, wherein the second set of attachment features comprise one or more sliding bushings configured to facilitate assembly of the structural attachment member to the subframe and torquing of one or more bolts for securing the structural attachment member to the subframe.

6. The apparatus of claim 5, wherein the one or more sliding bushings comprise a plurality of sliding bushings configured to provide a bending strength for an assembly including the subframe, the structural attachment member, and the battery pack.

7. The apparatus of claim 5, wherein the one or more sliding bushings comprise a single sliding bushing, and wherein the second set of attachment features comprise an end plate having an opening that is aligned with the single sliding bushing.

8. The apparatus of claim 1, wherein the first set of attachment features comprises one or more openings configured to receive one or more bolts that pass through a plate attached to the battery pack.

9. The apparatus of claim 1, wherein the first set of attachment features comprises one or more openings configured to receive one or more bolts that extend from a bracket that is welded to the battery pack.

10. An apparatus, comprising:
- a subframe for a vehicle;
- a structural attachment member; and
- a battery pack having a longitudinal member,
- wherein a load path extends along a continuous line from the subframe to the longitudinal member of the battery pack,
- wherein the structural attachment member comprises:
  - a first set of attachment features for attaching the structural attachment member to the battery pack, and
  - a second set of attachment features for attaching the structural attachment member to the subframe of the vehicle, and
- wherein the load path is substantially aligned in a longitudinal direction of the vehicle.

11. The apparatus of claim 10, wherein the continuous line comprises a smoothly continuous line, and wherein the structural attachment member forms a portion of the load path and aligns a longitudinal member of the subframe and the longitudinal member of the battery pack along the smoothly continuous line.

12. The apparatus of claim 11, wherein the subframe is attachable, at a first end, to the structural attachment member, and, at a second end, to a bumper of the vehicle, wherein the structural attachment member is attached to a first end of a frame the battery pack, and wherein the battery pack includes, attached to the frame at or near a second end of the frame, a modular enclosure for one or more electrical components.

13. The apparatus of claim 12, wherein the subframe comprises a frame structure that defines a first portion of the load path, the first portion coupled, via the structural attachment member, to a second portion of the load path, the second portion defined by the longitudinal member of the battery pack.

14. The apparatus of claim 10, wherein the load path comprises a first load path, and wherein a second load path extends, in parallel with the first load path, along another continuous line from the subframe to another longitudinal member of the battery pack.

15. A vehicle, comprising:
- a structural attachment member configured to:
  - attach a battery pack for the vehicle to a subframe of the vehicle, and
  - provide a load path from the subframe to the battery pack;
- wherein the structural attachment member comprises:
  - a first set of attachment features for attaching the structural attachment member to the battery pack, and a second set of attachment features for attaching the structural attachment member to the subframe of the vehicle; and wherein the load path is substantially aligned in a longitudinal direction of the vehicle.

16. The vehicle of claim 15, further comprising:

the battery pack; and a bracket welded to a frame of the battery pack and having one or more features configured to secure the structural attachment member to the battery pack.

17. The vehicle of claim 16, further comprising a vehicle body, wherein the subframe is configured to be mounted to the vehicle body via the structural attachment member.

18. The vehicle of claim 15, wherein the subframe is detachable from the structural attachment member and the battery pack without removing the battery pack from the vehicle.

19. The vehicle of claim 15, wherein the battery pack is removable from the vehicle without removing the subframe from the vehicle.

* * * * *